(12) United States Patent
Kim et al.

(10) Patent No.: US 8,096,899 B2
(45) Date of Patent: Jan. 17, 2012

(54) GOLF BALL COMPRISING ISOCYANATE-MODIFIED COMPOSITION

(75) Inventors: Hyun J. Kim, Carlsbad, CA (US); Hong G. Jeon, Carlsbad, CA (US); Jae S. Lee, Los Angeles, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 402 days.

(21) Appl. No.: 12/337,345

(22) Filed: Dec. 17, 2008

(65) Prior Publication Data

US 2009/0170633 A1    Jul. 2, 2009

Related U.S. Application Data

(60) Provisional application No. 61/017,283, filed on Dec. 28, 2007.

(51) Int. Cl.
- *A63B 37/12* (2006.01)
- *C08L 29/04* (2006.01)
- *C08L 53/02* (2006.01)

(52) U.S. Cl. ........ 473/377; 473/374; 473/376; 525/92 C; 525/124

(58) Field of Classification Search ............... None
See application file for complete search history.

(56) References Cited

U.S. PATENT DOCUMENTS

| | | |
|---|---|---|
| 3,264,272 A | 8/1966 | Rees et al. |
| 3,265,272 A | 8/1966 | Smith |
| 3,359,231 A | 12/1967 | George |
| 3,388,186 A | 6/1968 | Kray et al. |
| 3,454,280 A | 7/1969 | Harrison et al. |
| 3,465,059 A | 9/1969 | Seven et al. |
| 3,492,245 A | 1/1970 | Calderon et al. |
| 3,528,936 A | 9/1970 | Kent et al. |
| 3,560,573 A | 2/1971 | Hayden et al. |
| 3,634,543 A | 1/1972 | Sherman |
| 3,726,835 A | 4/1973 | Bertozzi |
| 3,804,803 A | 4/1974 | Streck et al. |
| 3,819,768 A | 6/1974 | Molitor |
| 3,974,092 A | 8/1976 | Streck et al. |
| 3,974,238 A | 8/1976 | Schweiker et al. |
| 3,989,568 A | 11/1976 | Isaac |
| 4,035,438 A | 7/1977 | Nielinger et al. |
| 4,104,216 A | 8/1978 | Clampitt |
| 4,115,475 A | 9/1978 | Foy et al. |
| 4,123,061 A | 10/1978 | Dusbiber |
| 4,153,772 A | 5/1979 | Schwesig et al. |
| 4,183,876 A | 1/1980 | Coran et al. |
| 4,195,015 A | 3/1980 | Deleens et al. |
| 4,217,430 A | 8/1980 | Starkweather et al. |
| 4,230,828 A | 10/1980 | Caul, Jr. et al. |
| 4,230,838 A | 10/1980 | Foy et al. |
| 4,248,432 A | 2/1981 | Hewitt et al. |
| 4,331,786 A | 5/1982 | Foy et al. |
| 4,332,920 A | 6/1982 | Foy et al. |
| 4,349,657 A | 9/1982 | Holloway |
| 4,404,325 A | 9/1983 | Mason et al. |
| 4,431,193 A | 2/1984 | Nesbitt |
| 4,482,663 A | 11/1984 | Kraus |
| 4,546,980 A | 10/1985 | Gendreau et al. |
| 4,611,810 A | 9/1986 | Kamata et al. |
| 4,692,497 A | 9/1987 | Gendreau et al. |
| 4,726,590 A | 2/1988 | Molitor |
| 4,728,693 A | 3/1988 | Dröscher et al. |
| 4,755,552 A | 7/1988 | Jadamus et al. |
| 4,762,322 A | 8/1988 | Molitor et al. |
| 4,781,383 A | 11/1988 | Kamada et al. |
| 4,792,141 A | 12/1988 | Llort |
| 4,798,386 A | 1/1989 | Berard |
| 4,838,556 A | 6/1989 | Sullivan |
| 4,839,441 A | 6/1989 | Cuzin et al. |
| 4,840,993 A | 6/1989 | Bartz |
| 4,844,471 A | 7/1989 | Terence et al. |
| 4,852,884 A | 8/1989 | Sullivan |
| 4,864,014 A | 9/1989 | Cuzin et al. |
| 4,865,326 A | 9/1989 | Isaac et al. |
| 4,884,814 A | 12/1989 | Sullivan |
| 4,894,411 A | 1/1990 | Okada et al. |
| 4,950,826 A | 8/1990 | Zerpner et al. |
| 4,955,966 A | 9/1990 | Yuki |
| 4,998,734 A | 3/1991 | Meyer |
| 5,007,647 A | 4/1991 | Gulick |
| 5,064,199 A | 11/1991 | Morell |

(Continued)

FOREIGN PATENT DOCUMENTS

EP    0 342 244    11/1989

(Continued)

OTHER PUBLICATIONS

U.S. Appl. No. 12/005,553, filed Dec. 26, 2007, Kuttappa.

(Continued)

*Primary Examiner* — Robert Sellers
(74) *Attorney, Agent, or Firm* — Klarquist Sparkman, LLP

(57) ABSTRACT

Presently disclosed embodiments concern an isocyanate-modified composition which includes A) from about 65 to about 99 weight % (based on the total weight of the isocyanate-modified composition) of a base polymer having either hydroxyl groups or amine groups or mixtures thereof, and B) from about 1 to about 35 weight % (based on the total weight of the isocyanate-modified composition) of a blocked isocyanate. The presently disclosed embodiments also include a golf ball made from the isocyanate-modified composition, and a method of making a golf ball using the isocyanate-modified composition, such as by injection molding.

14 Claims, 4 Drawing Sheets

U.S. PATENT DOCUMENTS

| | | | |
|---|---|---|---|
| 5,130,372 A | 7/1992 | Lences et al. | |
| 5,150,905 A | 9/1992 | Yuki et al. | |
| 5,228,697 A | 7/1993 | Gulick et al. | |
| 5,252,652 A | 10/1993 | Egashira et al. | |
| 5,253,871 A | 10/1993 | Viollaz | |
| 5,301,951 A | 4/1994 | Morell | |
| 5,306,760 A | 4/1994 | Sullivan | |
| 5,312,857 A | 5/1994 | Sullivan | |
| 5,324,783 A | 6/1994 | Sullivan | |
| 5,330,195 A | 7/1994 | Gulick | |
| 5,334,673 A | 8/1994 | Wu | |
| 5,384,385 A | 1/1995 | Trinks et al. | |
| 5,385,776 A | 1/1995 | Maxfield et al. | |
| 5,424,006 A | 6/1995 | Murayama et al. | |
| 5,436,295 A | 7/1995 | Nishikawa et al. | |
| 5,460,367 A | 10/1995 | Horiuchi | |
| 5,484,870 A | 1/1996 | Wu | |
| 5,496,035 A | 3/1996 | Gilchrist et al. | |
| 5,542,680 A | 8/1996 | Proudfit et al. | |
| 5,609,535 A | 3/1997 | Morgan | |
| 5,651,741 A | 7/1997 | Masutani et al. | |
| 5,688,859 A | 11/1997 | Sullivan | |
| 5,691,066 A | 11/1997 | Rajagopalan | |
| 5,692,974 A | 12/1997 | Wu et al. | |
| 5,733,205 A | 3/1998 | Higuchi et al. | |
| 5,766,097 A | 6/1998 | Horiuchi et al. | |
| 5,776,012 A | 7/1998 | Moriyama et al. | |
| 5,779,561 A | 7/1998 | Sullivan et al. | |
| 5,789,475 A | 8/1998 | Chen | |
| 5,810,677 A | 9/1998 | Maruko et al. | |
| 5,810,678 A | 9/1998 | Cavallaro et al. | |
| 5,816,943 A | 10/1998 | Masutani et al. | |
| 5,833,553 A | 11/1998 | Sullivan et al. | |
| 5,886,103 A | 3/1999 | Bellinger et al. | |
| 5,948,862 A | 9/1999 | Sano et al. | |
| 5,959,059 A | 9/1999 | Vedula et al. | |
| 5,962,533 A | 10/1999 | Bergeron, Jr. | |
| 5,962,553 A | 10/1999 | Ellsworth | |
| 5,973,046 A | 10/1999 | Chen et al. | |
| 5,985,370 A | 11/1999 | Ohira et al. | |
| 5,989,135 A | 11/1999 | Welch | |
| 5,989,136 A | 11/1999 | Renard et al. | |
| 6,012,991 A | 1/2000 | Kim et al. | |
| 6,012,992 A | 1/2000 | Yavitz | |
| 6,037,419 A | 3/2000 | Takesue et al. | |
| 6,042,489 A | 3/2000 | Renard et al. | |
| 6,060,549 A | 5/2000 | Li et al. | |
| 6,068,561 A | 5/2000 | Renard et al. | |
| 6,083,119 A | 7/2000 | Sullivan et al. | |
| 6,100,321 A | 8/2000 | Chen | |
| 6,117,024 A | 9/2000 | Dewanjee | |
| 6,117,025 A | 9/2000 | Sullivan | |
| 6,142,887 A | 11/2000 | Sullivan et al. | |
| 6,162,135 A | 12/2000 | Bulpett et al. | |
| 6,180,722 B1 | 1/2001 | Dalton et al. | |
| 6,183,382 B1 | 2/2001 | Kim et al. | |
| 6,193,617 B1 | 2/2001 | Mertens | |
| 6,203,451 B1 | 3/2001 | Rajagopalan | |
| 6,255,361 B1 | 7/2001 | Rajagopalan et al. | |
| 6,309,706 B2 | 10/2001 | Maruoka et al. | |
| 6,315,681 B1 | 11/2001 | Sullivan | |
| 6,329,458 B1 | 12/2001 | Takesu et al. | |
| 6,361,455 B1 | 3/2002 | Takemura | |
| 6,368,237 B1 | 4/2002 | Sullivan | |
| 6,416,424 B2 | 7/2002 | Sullivan | |
| 6,419,594 B1 | 7/2002 | Nesbitt et al. | |
| 6,426,387 B1 | 7/2002 | Kim | |
| 6,435,986 B1 | 8/2002 | Wu et al. | |
| 6,454,666 B1 | 9/2002 | Shira | |
| 6,462,303 B1 | 10/2002 | Brown | |
| 6,476,176 B1 | 11/2002 | Wu | |
| 6,485,378 B1 | 11/2002 | Boehm | |
| 6,503,156 B1 | 1/2003 | Sullivan | |
| 6,506,130 B2 | 1/2003 | Sullivan | |
| 6,508,724 B2 | 1/2003 | Dalton | |
| 6,508,725 B1 | 1/2003 | Kim | |
| 6,520,871 B1 | 2/2003 | Sullivan et al. | |
| 6,525,157 B2 | 2/2003 | Cozewith et al. | |
| 6,537,158 B2 | 3/2003 | Watanabe | |
| 6,558,277 B1 | 5/2003 | Ohira et al. | |
| 6,562,906 B2 | 5/2003 | Chen | |
| 6,569,037 B2 | 5/2003 | Ichikawa et al. | |
| 6,582,326 B2 | 6/2003 | Wu et al. | |
| 6,592,472 B2 | 7/2003 | Dewanjee | |
| 6,610,812 B1 | 8/2003 | Wu et al. | |
| 6,616,552 B2 | 9/2003 | Takesue et al. | |
| 6,635,715 B1 | 10/2003 | Datta et al. | |
| 6,635,716 B2 | 10/2003 | Voorheis et al. | |
| 6,639,024 B2 | 10/2003 | Simonds et al. | |
| 6,642,316 B1 | 11/2003 | Datta et al. | |
| 6,649,678 B1 | 11/2003 | Sandstrom | |
| 6,653,382 B1 | 11/2003 | Statz et al. | |
| 6,653,403 B2 | 11/2003 | Dalton et al. | |
| 6,762,273 B2 | 1/2004 | Dewanjee | |
| 6,692,379 B2 | 2/2004 | Morgan et al. | |
| 6,695,718 B2 | 2/2004 | Nesbitt | |
| 6,719,646 B2 | 4/2004 | Calabria et al. | |
| 6,762,244 B2 | 7/2004 | Rajagopalan et al. | |
| 6,770,360 B2 | 8/2004 | Mientus et al. | |
| 6,776,942 B2 | 8/2004 | Kim | |
| 6,777,472 B1 | 8/2004 | Statz et al. | |
| 6,780,126 B2 | 8/2004 | Ladd et al. | |
| 6,780,127 B2 | 8/2004 | Kennedy, III | |
| 6,793,864 B1 | 9/2004 | Dewanjee et al. | |
| 6,794,447 B1 | 9/2004 | Kim et al. | |
| 6,812,276 B2 | 11/2004 | Yeager | |
| 6,815,480 B2 | 11/2004 | Statz et al. | |
| 6,835,146 B2 | 12/2004 | Jordan et al. | |
| 6,852,784 B2 | 2/2005 | Sullivan | |
| 6,861,474 B2 | 3/2005 | Kim | |
| 6,878,075 B2 | 4/2005 | Kim | |
| 6,894,098 B2 | 5/2005 | Rajagopalan et al. | |
| 6,903,178 B2 | 6/2005 | Wu et al. | |
| 6,905,423 B2 | 6/2005 | Morgan et al. | |
| 6,919,395 B2 | 7/2005 | Rajagopalan et al. | |
| 6,924,337 B2 | 8/2005 | Kim et al. | |
| 6,930,150 B2 | 8/2005 | Kim et al. | |
| 6,939,924 B2 * | 9/2005 | Kim et al. | 525/457 |
| 6,949,595 B2 | 9/2005 | Morgan et al. | |
| 6,951,519 B2 | 10/2005 | Dewanjee et al. | |
| 6,960,629 B2 | 11/2005 | Voorheis et al. | |
| 6,962,951 B1 | 11/2005 | Takesue et al. | |
| 6,974,854 B2 | 12/2005 | Dewanjee | |
| 7,001,286 B2 | 2/2006 | Kim et al. | |
| 7,026,399 B2 | 4/2006 | Kim et al. | |
| 7,037,985 B2 | 5/2006 | Kim et al. | |
| 7,041,769 B2 | 5/2006 | Wu et al. | |
| 7,070,518 B2 | 7/2006 | Kennedy, III | |
| 7,163,471 B2 | 1/2007 | Kim et al. | |
| 7,169,861 B2 | 1/2007 | Kim et al. | |
| 7,182,703 B2 | 2/2007 | Emerson et al. | |
| 7,208,546 B2 | 4/2007 | Rajagopalan et al. | |
| 7,226,961 B2 | 6/2007 | Park et al. | |
| 7,230,127 B2 | 6/2007 | Sage et al. | |
| 7,242,443 B2 | 7/2007 | Sage et al. | |
| 7,261,647 B2 | 8/2007 | Sullivan et al. | |
| 7,265,195 B2 | 9/2007 | Kuntimaddi et al. | |
| 7,276,570 B2 | 10/2007 | Kuntimaddi et al. | |
| 7,314,896 B2 | 1/2008 | Rajagopalan et al. | |
| 7,332,533 B2 | 2/2008 | Kim et al. | |
| 7,378,483 B2 | 5/2008 | Wu et al. | |
| 7,462,113 B2 | 12/2008 | Kim et al. | |
| 7,491,136 B2 | 2/2009 | Deng et al. | |
| 7,528,196 B2 | 5/2009 | Kim et al. | |
| 7,534,838 B2 | 5/2009 | Kim et al. | |
| 7,687,116 B2 | 3/2010 | Kim et al. | |
| 7,767,759 B2 | 8/2010 | Kim | |
| 7,874,940 B2 | 1/2011 | Kim et al. | |
| 7,878,926 B2 | 2/2011 | Kim et al. | |
| 2001/0005699 A1 | 6/2001 | Morgan et al. | |
| 2001/0019971 A1 | 9/2001 | Hayashi et al. | |
| 2001/0031669 A1 | 10/2001 | Ohama | |
| 2001/0046906 A1 | 11/2001 | Rajagopalan et al. | |
| 2002/0040111 A1 | 4/2002 | Rajagopalan | |
| 2002/0045499 A1 | 4/2002 | Takemura et al. | |
| 2002/0049099 A1 | 4/2002 | Peter | |
| 2002/0061792 A1 | 5/2002 | Yagley et al. | |

| | | | | | | |
|---|---|---|---|---|---|---|
| 2002/0065149 A1 | 5/2002 | Tzivanis et al. | | 2008/0090678 A1* | 4/2008 | Kim et al. .................. 473/378 |
| 2002/0193181 A1 | 12/2002 | Kennedy et al. | | 2008/0139334 A1 | 6/2008 | Willett et al. |
| 2003/0008975 A1 | 1/2003 | Takesue et al. | | 2008/0146374 A1 | 6/2008 | Beach et al. |
| 2003/0012902 A1 | 1/2003 | Kim et al. | | 2008/0176677 A1* | 7/2008 | Snell et al. .................. 473/376 |
| 2003/0017888 A1 | 1/2003 | Higuchi et al. | | 2008/0214326 A1 | 9/2008 | Kim et al. |
| 2003/0050373 A1 | 3/2003 | Chen | | 2008/0274825 A1 | 11/2008 | Kim et al. |
| 2003/0060307 A1 | 3/2003 | Umezawa et al. | | 2009/0023518 A1 | 1/2009 | Kim et al. |
| 2003/0064826 A1 | 4/2003 | Voorheis et al. | | 2009/0191981 A1 | 7/2009 | Kim et al. |
| 2003/0069087 A1 | 4/2003 | Ichikawa et al. | | 2010/0160081 A1 | 6/2010 | Kim et al. |
| 2003/0078348 A1 | 4/2003 | Rajagopalan et al. | | 2010/0179002 A1 | 7/2010 | Kim et al. |
| 2003/0096661 A1 | 5/2003 | Kim | | | | |
| 2003/0119989 A1 | 6/2003 | Ladd et al. | | FOREIGN PATENT DOCUMENTS | | |
| 2003/0130066 A1 | 7/2003 | Sasaki | | | | |
| 2003/0158312 A1 | 8/2003 | Chen | | EP | 0 577 058 | 1/1994 |
| 2003/0224871 A1 | 12/2003 | Kim et al. | | EP | 0 601 861 | 6/1994 |
| 2003/0228937 A1 | 12/2003 | Dewanjee | | GB | 2 278 609 | 12/1994 |
| 2003/0229183 A1 | 12/2003 | Voorheis et al. | | GB | 2 320 439 | 6/1998 |
| 2004/0019138 A1 | 1/2004 | Voorheis et al. | | JP | 59157122 | 9/1984 |
| 2004/0044136 A1 | 3/2004 | Kim et al. | | JP | 60249980 | 12/1985 |
| 2004/0059062 A1 | 3/2004 | Kim | | JP | 62267357 | 11/1987 |
| 2004/0082408 A1 | 4/2004 | Sullivan et al. | | JP | 63221157 | 9/1988 |
| 2004/0092336 A1 | 5/2004 | Kim et al. | | JP | 02092379 | 4/1990 |
| 2004/0097653 A1 | 5/2004 | Kim et al. | | JP | 04001231 | 1/1992 |
| 2004/0106474 A1 | 6/2004 | Hayashi et al. | | JP | 05007635 | 1/1993 |
| 2004/0161623 A1 | 8/2004 | Domine et al. | | JP | 06313075 | 11/1994 |
| 2004/0176185 A1 | 9/2004 | Morgan et al. | | JP | 10127822 | 5/1998 |
| 2004/0176188 A1 | 9/2004 | Morgan et al. | | JP | 10137364 | 5/1998 |
| 2004/0180733 A1 | 9/2004 | Kim | | JP | 10231400 | 9/1998 |
| 2004/0201133 A1 | 10/2004 | Dewanjee et al. | | JP | 11299933 | 11/1999 |
| 2004/0209708 A1 | 10/2004 | Bulpett et al. | | JP | 2000-005341 | 1/2000 |
| 2004/0230005 A1 | 11/2004 | Voorheis et al. | | JP | 2000-060999 | 2/2000 |
| 2004/0230006 A1 | 11/2004 | Voorheis et al. | | JP | 2000-061001 | 2/2000 |
| 2004/0230007 A1 | 11/2004 | Voorheis et al. | | JP | 2000-070409 | 3/2000 |
| 2004/0233347 A1 | 11/2004 | Sage et al. | | JP | 2000-070411 | 3/2000 |
| 2004/0235584 A1 | 11/2004 | Chao et al. | | JP | 2000-070412 | 3/2000 |
| 2004/0236030 A1 | 11/2004 | Kim et al. | | JP | 2000-070414 | 3/2000 |
| 2004/0245503 A1 | 12/2004 | Sage et al. | | JP | 2001-218872 | 8/2001 |
| 2004/0248669 A1 | 12/2004 | Kim et al. | | JP | 2002-65896 A | 3/2002 |
| 2004/0248670 A1 | 12/2004 | Okamoto et al. | | JP | 2003-339910 | 12/2003 |
| 2004/0248671 A1 | 12/2004 | Kim et al. | | JP | 2005-066040 | 3/2005 |
| 2004/0248672 A1 | 12/2004 | Jeon et al. | | JP | 2005-137743 | 6/2005 |
| 2004/0254298 A1 | 12/2004 | Kim et al. | | JP | 09227737 | 9/2007 |
| 2004/0266553 A1 | 12/2004 | Park et al. | | WO | WO 93/11190 | 6/1993 |
| 2004/0266554 A1 | 12/2004 | Park et al. | | WO | WO 98/43709 | 10/1998 |
| 2004/0266555 A1 | 12/2004 | Park et al. | | WO | WO 99/20354 | 4/1999 |
| 2005/0020385 A1 | 1/2005 | Onoda et al. | | WO | WO 99/54001 | 10/1999 |
| 2005/0037870 A1 | 2/2005 | Sullivan et al. | | WO | WO 00/41773 | 7/2000 |
| 2005/0059756 A1 | 3/2005 | Kim et al. | | WO | WO 00/57962 | 10/2000 |
| 2005/0075196 A1 | 4/2005 | Shimizu et al. | | WO | WO 02/09823 | 2/2002 |
| 2005/0148409 A1 | 7/2005 | Morgan et al. | | WO | WO 02/062914 | 8/2002 |
| 2005/0148725 A1 | 7/2005 | Statz et al. | | WO | WO 96/40378 | 12/2006 |
| 2005/0197211 A1 | 9/2005 | Sullivan et al. | | | | |
| 2005/0197464 A1 | 9/2005 | Handlin, Jr. | | OTHER PUBLICATIONS | | |
| 2005/0197465 A1 | 9/2005 | Handlin, Jr. | | | | |
| 2005/0215963 A1 | 9/2005 | Autran et al. | | U.S. Appl. No. 12/336,296, filed Dec. 16, 2008, Kim. | | |
| 2005/0215964 A1 | 9/2005 | Autran et al. | | U.S. Appl. No. 12/343,090, filed Dec. 23, 2008, Loper et al. | | |
| 2005/0239575 A1 | 10/2005 | Chao et al. | | U.S. Appl. No. 12/343,151, filed Dec. 23, 2008, Snell et al. | | |
| 2005/0244638 A1 | 11/2005 | Chang et al. | | Akrochem Proaid AC 18E product literature (no date). | | |
| 2005/0245652 A1 | 11/2005 | Bulpett et al. | | DeStefani, "Small but Mighty," *Molding Systems* 3:34-46, Oct. 1999. | | |
| 2005/0250601 A1 | 11/2005 | Kim et al. | | DuPont Packaging & Industrial Polymers, DuPont™ Surlyn® 8150 | | |
| 2005/0256276 A1 | 11/2005 | Elkin et al. | | Data Sheet (3 pages), E.I. DuPont De Nemours and Company, Inc., | | |
| 2005/0261424 A1 | 11/2005 | Snell et al. | | Mar. 2004. | | |
| 2005/0288446 A1 | 12/2005 | Zieske et al. | | DuPont Packaging & Industrial Polymers, DuPont™ Surlyn® 9150 | | |
| 2006/0014898 A1 | 1/2006 | Kim | | Data Sheet (3 pages), E.I. DuPont De Nemours and Company, Inc., | | |
| 2006/0030427 A1 | 2/2006 | Kim et al. | | Mar. 2004. | | |
| 2006/0166761 A1 | 7/2006 | Kim et al. | | DuPont Product Literature for HPF1000, May 2005. | | |
| 2006/0166762 A1 | 7/2006 | Kim et al. | | DuPont Product Literature for HPF2000, May 2005. | | |
| 2006/0172823 A1 | 8/2006 | Loper et al. | | DuPont™ Surlyn® molding resins for golf ball manufacturing, Golf | | |
| 2006/0247074 A1 | 11/2006 | Kim et al. | | Ball Resins, http://www2.dupont.com/Surlyn/en_US/products/ | | |
| 2007/0015605 A1 | 1/2007 | Kim et al. | | golfball_resins.html, downloaded Dec. 27, 2007. | | |
| 2007/0054754 A1 | 3/2007 | Kim et al. | | *Encyclopedia of Chemical Technology* 6:415-418, 1993. | | |
| 2007/0059273 A1* | 3/2007 | Price et al. .................. 424/78.09 | | *Encyclopedia of Polymer Science and Engineering* 7:54-55, 1988. | | |
| 2007/0100085 A1 | 5/2007 | Kim et al. | | *Hawley's Condensed Chemical Dictionary*, 13$^{th}$ edition, pp. 206, | | |
| 2007/0142568 A1 | 6/2007 | Kim et al. | | 828, 2001. | | |
| 2007/0213144 A1 | 9/2007 | Comeau et al. | | http://www.chemsoc.org/chembytes/ezine/2002/birkitt_july02.htm | | |
| 2007/0232756 A1 | 10/2007 | Kim et al. | | (accessed Nov. 1, 2006). | | |
| 2007/0238552 A1 | 10/2007 | Kim et al. | | http://bppetrochemicals.com (accessed Nov. 1, 2006) (http://bp.com/ | | |
| 2007/0243954 A1 | 10/2007 | Sullivan et al. | | modularhome.do?categoryId=-6110). | | |
| 2008/0009371 A1 | 1/2008 | Mayer, Jr. | | | | | http://www.nml.csir.co.za/news/20020711/index1.htm (accessed May 29, 2007).
http://www3.interscience.wiley.com/cgi-bin/abstract/70000886/ABSTRACT (accessed May 29, 2007).
Research Disclosure 29703, E.I. DuPont de Nemours & Co., 2 pages, published Jan. 1989.
Rostek et al., "Novel Sulfur Vulcanization Accelerators Based on Mercapto-Pyridine, —Pyrazine, and —Pyrimidine," *Rubber and Chemistry Technology* 69(2):180-202, 1996.
Saunders, "Polyurethanes Chemistry and Technology Part I," pages 32-43, 1962.
Sherman, "Close-Up on Technology—TP Elastomers—New Metallocene TP Elastomers Tackle Films, Fibers, TPOs," *Plastics Technology Online Article*, http://www.plasticstechnology.com/articles/200310cu2.html, downloaded Dec. 5, 2005.
Shuler et al., "Fate of Erucamide in Polyolefin Films at Elevated Temperature," *Polym. Eng. Sci.* 44:2247-2253, 2004.
Technical Data, *General Information about Nanomers, Nanocor*, 2 pages (No Date).
Thain, *Science and Golf IV*, pp. 319-327, Jul. 2002.
U.S. Appl. No. 11/486,938, filed Jul. 13, 2006, Kim et al.
U.S. Appl. No. 11,879,833, filed Jul. 18, 2007, Lee et al.
U.S. Appl. No. 61/009,427, filed Dec. 28, 2007, Snell et al.

\* cited by examiner

GOLF BALL COMPRISING ISOCYANATE-MODIFIED COMPOSITION

CROSS-REFERENCE TO RELATED APPLICATION

This application claims the benefit of the earlier filing date of U.S. Provisional Application No. 61/017,283, which was filed on Dec. 28, 2007. The entire disclosure of the provisional application is considered to be part of the disclosure of the following application and is hereby incorporated by reference.

FIELD

Disclosed embodiments concern compositions comprising a base polymer having either hydroxyl groups, amine groups or mixtures thereof, and a blocked isocyanate, where the compositions are particularly useful for making sports equipment, such as golf balls.

BACKGROUND

The application of synthetic polymer chemistry to the field of sports equipment has revolutionized the performance of athletes in many sports. One sport in which this is particularly true is golf, especially as relates to advances in golf ball performance and ease of manufacture. For instance, the earliest golf balls consisted of a leather cover filled with wet feathers. These "feathery" golf balls were subsequently replaced with a single piece golf ball made from "gutta percha," a naturally occurring rubber-like material. In the early 1900's, the wound rubber ball was introduced, consisting of a solid rubber core around which rubber thread was tightly wound with a gutta percha cover. More modern golf balls can be classified as one-piece, two-piece, and three-piece. One-piece balls are molded from a homogeneous mass of material upon which is molded a dimple pattern. One-piece balls are inexpensive and very durable, but do not provide great distance because of relatively high spin and low velocity. Two-piece balls are made by molding a cover around a solid rubber core. These are the most popular types of balls in use today. In attempts to further modify the ball performance, especially in terms of the distance such balls travel, and the feel transmitted to the golfer through the club on striking the ball, the basic two piece ball construction has been further modified by the introduction of additional layers between the core and outer cover layer. If one additional layer is introduced between the core and outer cover layer, a so called "three-piece ball" results, and similarly, if two additional layers are introduced between the core and outer cover layer, a so called "four-piece ball" results, and so on.

Balata had been used as the primary material for covers of golf balls until the 1960's when SURLYN®, an ionomeric resin made by E.I. DuPont de Nemours & Co., was introduced to the golf industry. Ionomers typically costs less than balata and have better cut or shear resistance. At the present time, ionomers are used as the primary polymer source for either or both of the cover stock and intermediate layers for most two-piece and some three-piece golf balls. The problem with ionomer-covered golf balls, however, is that they often lack the "click" and "feel" which golfers had become accustomed to with balata. "Click" is the sound made when the ball is hit by a golf club while "feel" is the overall sensation imparted to the golfer when the ball is hit.

However, unlike ionomer-covered golf balls, polyurethane- or polyurea-covered golf balls can be made to have the "click" and "feel" of balata and the cut or shear resistance of ionomer. Polyurethanes or polyureas are typically prepared by the reaction of a diisocyanate with a polyol (in the case of polyurethanes) or with a polyamine (in the case of a polyurea). Thermoplastic polyurethanes or polyureas may consist solely of this initial mixture or may be further combined with a chain extender to vary properties such as hardness of the thermoplastic. Thermoset polyurethanes or polyureas typically are formed by the reaction of a diisocyanate and a polyol or polyamine respectively, and an additional crosslinking agent to crosslink or cure the material to result in a thermoset.

In view of the aforementioned advantages of polyurethane and polyurea as a golf ball component, numerous patents have disclosed various formulations for these materials. For example, Hewitt et al., U.S. Pat. No. 4,248,432 discloses a thermoplastic polyester urethane golf ball cover formed from a reaction product of a polyester glycol with para-phenylene diisocyanate (PPDI) or cyclohexane diisocyanate, in the substantial absence of curing or crosslinking agents. U.S. Pat. No. 4,123,061 teaches that a golf ball can be made from a polyurethane prepolymer of polyether and a curing agent, such as a trifunctional polyol, a tetrafunctional polyol or a diamine. U.S. Pat. No. 3,989,568 teaches a three-component system employing either one or two polyurethane prepolymers and one or two curing agents. Both polyol and diamine curing agents are taught by the '568 patent. Dusbiber, U.S. Pat. No. 4,123,061, discloses a polyurethane golf ball cover prepared from the reaction product of a polyether, a diisocyanate and a curing agent. Holloway, U.S. Pat. No. 4,349,657 discloses a method for preparing polyester urethanes with PPDI by reacting a polyester (e.g. prepared from aliphatic glycols having 2-8 carbons reacted with aliphatic dicarboxylic acids having 4-10 carbons) with a molar excess of PPDI to obtain an isocyanate-terminated polyester urethane (in liquid form and stable at reaction temperatures), and then reacting the polyester urethane with additional polyester. Wu, U.S. Pat. No. 5,334,673 discloses a polyurethane prepolymer cured with a slow-reacting curing agent selected from slow-reacting polyamine curing agents and difunctional glycols). Wu, U.S. Pat. No. 5,484,870 discloses golf balls having covers composed of a polyurea composition. The polyurea composition disclosed is a reaction product of an organic isocyanate having at least two functional groups and an organic amine having at least two functional groups. One of the organic isocyanates disclosed is PPDI.

Initially, thermoset polyurethanes or polyureas were prepared in what is known as a one-shot process, in which the three reactants, diisocyanate, polyol or polyamine and the curing agent were combined in one step. However in view of the handling problems associated with the diisocyanate starting materials, more recently a two step process is now ubiquitous in the industry in which the golf ball manufacturer would purchase a so-called prepolymer formed by the reaction of the diisocyanate and the polyol (in the case of polyurethane) or the diisocyanate and a polyamine (in the case of a polyurea). This prepolymer poses fewer toxicity problems than the free isocyanate and is thus easier to handle. To the prepolymer is then added either the chain extender or the curing agent prior to or during golf ball layer formation. This procedure is known as the prepolymer process.

Conventionally, golf ball cover and intermediate layers are positioned over a core or other internal layers using one of three methods; injection molding, casting, or compression molding, depending on whether the polymer component is a thermoplastic or a thermoset. Because of their excellent flowability, thermoplastics, including thermoplastic polyurethanes, can be readily formed around a golf ball core using injection molding. Injection molding of thermoplastics generally involves using a mold having one or more sets of two hemispherical mold sections that mate to form a spherical cavity during the molding process. The pairs of mold sections are configured to define a spherical cavity in their interior when mated. When used to mold an outer cover layer for a golf ball, the mold sections can be configured so that the inner surfaces that mate to form the spherical cavity include protrusions configured to form dimples on the outer surface of the molded cover layer. The mold sections are connected to openings, or gates, evenly distributed near or around the parting line, or point of intersection, of the mold sections through which the material to be molded flows into the cavity. The gates are connected to a runner and a sprue that serve to channel the molding material through the gates. When used to mold a layer onto an existing structure, such as a ball core, the mold includes a number of support pins disposed throughout the mold sections. The support pins are configured to be retractable, moving into and out of the cavity perpendicular to the spherical cavity surface. The support pins maintain the position of the core while the molten material flows through the gates into the cavity between the core and the mold sections. The mold itself may be a cold mold or a heated mold. In the case of a heated mold, thermal energy is applied to the material in the mold so that a chemical reaction may take place in the material.

Unfortunately, golf ball covers comprising thermoplastic polyurethane typically exhibit poor shear-cut resistance. Thus, while thermoplastic polyurethane covers are less expensive to make due to their superior processability, they are not favored due to the resulting inferior ball performance.

In contrast, golf ball layers prepared from thermosets, such as thermoset polyurethanes or polyureas, typically exhibit excellent shear-cut resistance and are much more scuff- and cut-resistant than thermoplastic polyurethanes or polyureas. Because such thermoset polyurethanes or polyureas typically have more desirable mechanical properties than the thermoplastic analogs, it would be beneficial to producers of golf balls to be able to use injection molding to prepare thermoset polyurethane or polyurea covers. Unfortunately, thermoset materials generally are not well suited for injection molding, because as the reactants for thermoset polyurethanes or polyureas are mixed, they begin to cure and become highly viscous while traveling through the sprue and into the runners of the injection mold, leading to injection difficulties.

Thus, thermoset materials typically are formed into a ball layer using a casting process free of any injection molding steps. In a casting process, the thermoset material is added directly to the mold sections immediately after it is created. Then, the material is allowed to partially cure to a gelatinous state, so that it will support the weight of a core. Once cured to this state, the core is positioned in one of the mold sections, and the two mold sections are then mated. The material then cures to completion, forming a layer around the core. The timing of the positioning of the core is crucial for forming a layer having uniform thickness. The equipment used for this positioning is costly, because the core must be centered in the material in its gelatinous state, and at least one of the mold sections, after having material positioned therein, must be turned over and positioned onto its corresponding mold section. As a result casting processes often lead to air pockets and voids in the layer being formed, resulting in a high incidence of rejected golf balls. The cost of rejected balls, complex equipment, and the exacting nature of the process combine to make casting a costly process in relation to injection molding. In addition, the nature of current casting processes is such that materials that require a relatively long time (in comparison to other fabrication methods) to sufficiently solidify, i.e., react thoroughly. As a result, materials or compounds with particular chemistries that react or solidify relatively quickly are generally restricted from use in commercial casting processes, particularly in the golf art.

This has led to the development of alternative fabrication techniques for thermosets such as reaction injection molding ("RIM"). As opposed to traditional injection molding, thermosetting materials and/or materials with relatively quick reaction or solidification times can be processed into certain articles using RIM. For example, U.S. Pat. No. 4,762,322 discloses golf clubs with heads that can be made from a hollow metal shell or a low density, high strength material, such as a reaction injection molded polyurethane, formed around weighted inserts. With respect to manufacture of golf balls, RIM has been disclosed, for example, in International Publication No. WO 00/57962, which claims golf balls, and processes for making such balls, comprising a reaction injection molded material, such as polyurethanes/polyureas. In addition, U.S. Pat. No. 6,083,119 discloses a multi-layer golf ball with an inner and outer cover layer, at least one of which can contain a reaction injection molded polyurethane material.

As mentioned above, by "reactive" it is meant that the polymer is formed from two or more components which react. In reaction injection molding, the two or more components are combined and reacted to produce the final polymerized material. Mixing of these separate components is critical, a distinct difference from traditional injection molding. The process of reaction injection molding a golf ball cover involves placing a golf ball core into a die, closing the die, injecting the reactive components into a mixing chamber where they combine, and transferring the combined material into the die. The mixing begins the polymerization reaction which is typically completed upon cooling of the cover material.

Generally, the components, prior to reacting, exhibit relatively low viscosities. The low viscosities of the components allow the use of lower temperatures and pressures than those utilized in traditional injection molding. However, the rapid subsequent reaction of the two components requires complex mixing heads to be used as precise control of mixing times and reagent stoichiometries.

Finally, in addition to materials which fall into the discrete categories of thermoplastic or thermoset, it has also been found possible to modify a thermoplastic polyurethane or polyurea compositions by introducing materials in the composition which are able to undergo subsequent curing in additional processing steps such as compression molding after injection molding the thermoplastic and result in properties similar to those of a thermoset. For example, Kim et al. in U.S. Pat. No. 6,939,924, the entire contents of which are hereby incorporated by reference, disclose a thermoplastic urethane or urea composition formed as a reaction product of diol or a polyol with an isocyanate; and further comprising a modified or blocked isocyanate, the resulting mixture may then be injection molded to form half shells which can then be placed around a golf ball core and compression molded under conditions sufficient to cause the blocked isocyanate to unblock and induce further cross linking to form a thermoset cover.

However, it would be extremely advantageous to develop a system in which a thermoset composition may be directly formed as a golf ball layer by utilizing a conventional injection molding process and equipment without the need for installation of the complex mixing and control systems typically associated with reaction injection molding and without the need for additional process steps to complete the cross linking process.

The present invention provides an isocyanate-modified composition comprising A) a solid polyol, solid polyamine or a solid polymer containing both hydroxyl- and amine-functionality and B) a blocked isocyanate. The compositions of the present invention may then be injection molded using conventional injection molding techniques at a temperature sufficient to cause unblocking of the isocyanate component and subsequent reaction to form either a thermoplastic or thermoset urethane or urea-modified article, depending upon the stoichiometry of the blocked isocyanate and polyol or polyamine components in the composition, and the time or temperature of the injection molding process.

In an especially preferred embodiment, using the composition of the present invention allows a golf ball layer to be manufactured having the mechanical properties of a thermoset polyurethane but using conventional injection molding techniques and without the requirement for either a single processing step, such as reaction injection molding (with its complex mixing and control systems), or the need for an initial injection molding step followed by a subsequent processing step, (such as compression molding) to form a thermoset.

SUMMARY

In one embodiment the present invention is a composition which includes A) from about 65 to about 99 weight % (based on the total weight of the isocyanate-modified composition) of a base polymer having either hydroxyl groups or amine groups or mixtures thereof; and B) from about 1 to about 35 weight % (based on the total weight of the isocyanate-modified composition) of a blocked isocyanate.

In another embodiment, the present invention is a golf ball having a cover layer, a core, and optionally one or more intermediate layers, and the cover layer includes the reaction product of A) from about 65 to about 99 weight % (based on the total weight of the isocyanate-modified composition) of a base polymer having either hydroxyl groups or amine groups or mixtures thereof; and B) from about 1 to about 35 weight % (based on the total weight of the isocyanate-modified composition) of a blocked isocyanate.

In another embodiment, the present invention is a method for making an article by injection molding a composition which includes A) from about 65 to about 99 weight % (based on the total weight of the isocyanate-modified composition) of a base polymer having either hydroxyl groups or amine groups or mixtures thereof; and B) from about 1 to about 35 weight % (based on the total weight of the isocyanate-modified composition) of a blocked isocyanate.

DETAILED DESCRIPTION OF INVENTION

Figure 1:
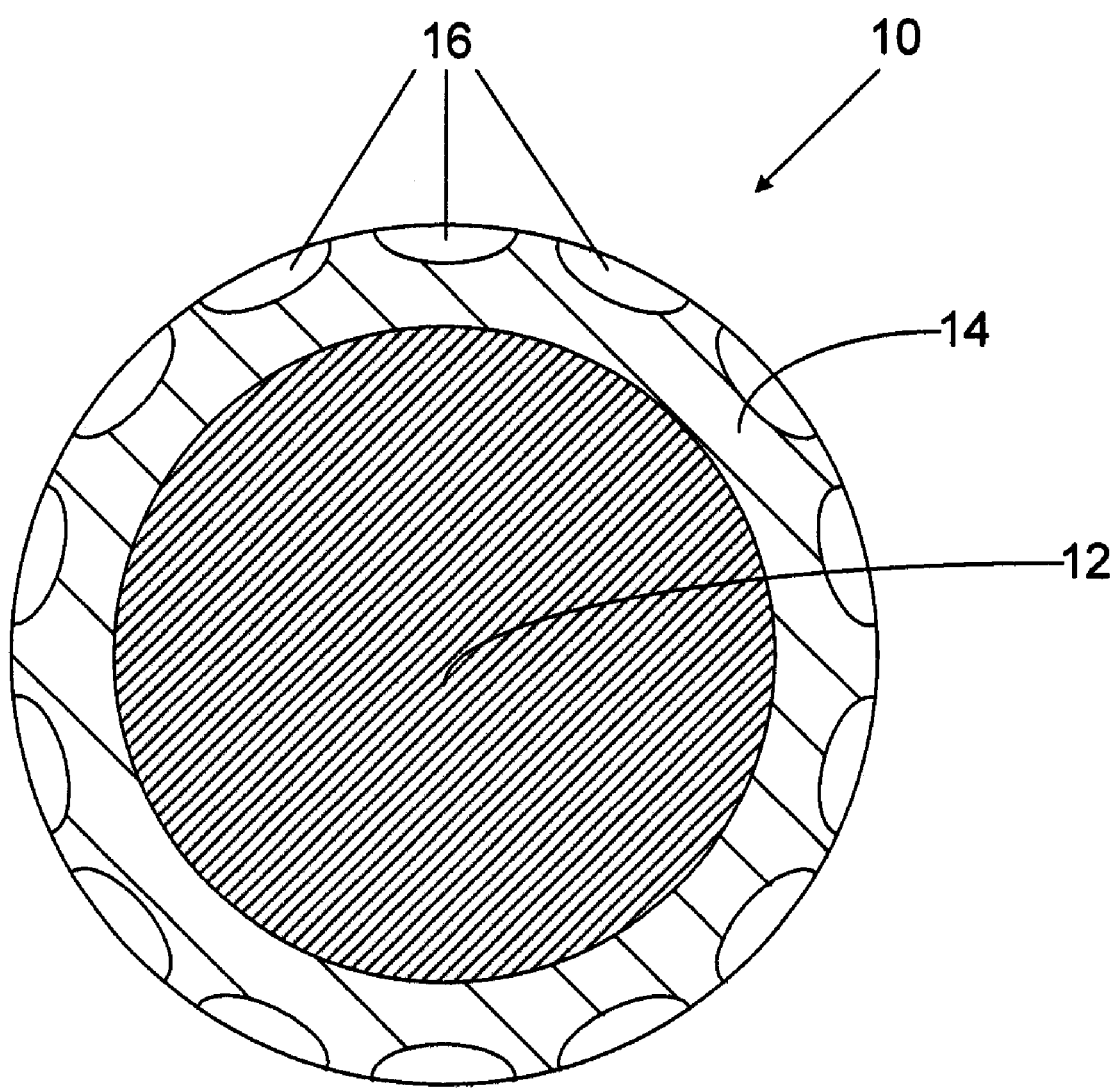
FIG. 1 is a schematic cross section of a two-piece golf ball.

The following definitions are provided to aid the reader, and are not intended to provide term definitions that would be narrower than would be understood by a person of ordinary skill in the art of golf ball composition and manufacture.

Any numerical values recited herein include all values from the lower value to the upper value. All possible combinations of numerical values between the lowest value and the highest value enumerated herein are expressly included in this application.

The term "bimodal polymer" refers to a polymer comprising two main fractions and more specifically to the form of the polymer's molecular weight distribution curve, i.e., the appearance of the graph of the polymer weight fraction as a function of its molecular weight. When the molecular weight distribution curves from these fractions are superimposed onto the molecular weight distribution curve for the total resulting polymer product, that curve will show two maxima or at least be distinctly broadened in comparison with the curves for the individual fractions. Such a polymer product is called bimodal. The chemical compositions of the two fractions may be different.

The term "blocked isocyanate" or "blocked polyisocyanate" is meant an adduct of isocyanate or polymer containing isocyanate functionality respectively, in which the isocyanate groups have been reacted with blocking agents which are compounds which contain an active hydrogen atom reactive with the isocyanate group. This reaction is reversible and at moderate temperatures (up to 200° C.), the blocking group will cleave from the blocked adduct, liberating free isocyanate.

The term "chain extender" as used herein is a compound added to either a polyurethane or polyurea prepolymer, (or the prepolymer starting materials), which undergoes additional reaction but at a level sufficiently low to maintain the thermoplastic properties of the final composition The term "conjugated" refers to an organic compound containing two or more sites of unsaturation (e.g., carbon-carbon double bonds, carbon-carbon triple bonds, and sites of unsaturation comprising atoms other than carbon, such as nitrogen) separated by a single bond.

The term "curing agent" or "curing system" as used interchangeably herein is a compound added to either polyurethane or polyurea prepolymer, (or the prepolymer starting materials), which imparts additional crosslinking to the final composition to render it a thermoset.

As used herein, the term "core" is intended to mean the elastic center of a golf ball, which may have a unitary construction. Alternatively the core itself may have a layered construction, e.g. having a spherical "center" and additional "core layers," with such layers being made of the same material or a different material from the core center.

The term "cover" is meant to include any layer of a golf ball that surrounds the core. Thus a golf ball cover may include both the outermost layer and also any intermediate layers, which are disposed between the golf ball center and outer cover layer. "Cover" may be used interchangeably with the term "cover layer".

A "fiber" is a general term and the definition provided by Engineered Materials Handbook, Vol. 2, "Engineering Plastics", published by A.S.M. International, Metals Park, Ohio, USA, is relied upon to refer to filamentary materials with a finite length that is at least 100 times its diameter, which typically is 0.10 to 0.13 mm (0.004 to 0.005 in.). Fibers can be continuous or specific short lengths (discontinuous), normally no less than 3.2 mm (⅛ in.). Although fibers according to this definition are preferred, fiber segments, i.e., parts of fibers having lengths less than the aforementioned also may be used in the present invention.

In the case of a ball with two intermediate layers, the term "inner intermediate layer" may be used interchangeably herein with the terms "inner mantle" or "inner mantle layer" and is intended to mean the intermediate layer of the ball positioned nearest to the core.

The term "intermediate layer" may be used interchangeably with "mantle layer," "inner cover layer" or "inner cover" and is intended to mean any layer(s) in a golf ball disposed between the core and the outer cover layer.

The term "(meth)acrylate" is intended to mean an ester of methacrylic acid and/or acrylic acid.

The term "(meth)acrylic acid copolymers" is intended to mean copolymers of methacrylic acid and/or acrylic acid.

A "nanofiller" is defined as a material having an aggregate structure with the aggregate particle sizes in the micron range and above. However, these aggregates have a stacked plate structure with the individual platelets being roughly from about 1 nanometer (nm) thick and from about 100 to about 1000 nm across. As a result, nanofillers have extremely high surface area, resulting in high reinforcement efficiency to the material at low loading levels of the particles. Inorganic nanofiller materials generally are made from clay, and to facilitate incorporation of the nanofiller material into the polymer material, either in preparing nanocomposite materials or in preparing polymer-based golf ball compositions, the clay particles generally are coated or treated by a suitable compatibilizing agent or coupling agent.

A "nanocomposite" is defined as a polymer matrix having nanofiller within the matrix. Nanocomposite materials and golf balls made comprising nanocomposite materials are disclosed in Kim et al., U.S. Pat. Nos. 6,794,447, and US Patent Publication No. 2005/0059756 A1, as well as U.S. Pat. Nos. 5,962,553 to Ellsworth, 5,385,776 to Maxfield et al., and 4,894,411 to Okada et al., the disclosure of each of which is incorporated herein by reference in their entirety.

The term "outer cover layer" is intended to mean the outermost cover layer of the golf ball on which, for example, the dimple pattern, paint and any writing, symbol, etc. is placed. If, in addition to the core, a golf ball comprises two or more cover layers, only the outermost layer is designated the outer cover layer. The remaining layers may be designated intermediate layers. The term outer cover layer is interchangeable with the term "outer cover".

In the case of a ball with two intermediate layers, the term "outer intermediate layer" may be used interchangeably herein with the terms "outer mantle" or "outer mantle layer" and is intended to mean the intermediate layer of the ball which is disposed nearest to the outer cover layer.

"Peptizers" are chemical(s) or compositions that have been used by rubber compounders to facilitate the processing of natural or synthetic rubbers and other difficult-to-process high viscosity elastomers during milling and mastication.

The term "polyalkenamer" is used interchangeably herein with the term "polyalkenamer rubber" and means a polymer of one or more alkenes, including cycloalkenes, having from 5-20, preferably 5-15, most preferably 5-12 ring carbon atoms. The polyalkenamers may be prepared by any suitable method including ring opening metathesis polymerization of one or more cycloalkenes in the presence of organometallic catalysts as described in U.S. Pat. Nos. 3,492,245, and 3,804,803, the entire contents of both of which are incorporated herein by reference.

The term "prepolymer" refers to any material that can be further processed to form a final polymer material of a manufactured golf ball, such as, by way of example and not limitation, a polymerized or partially polymerized material that can undergo additional processing, such as crosslinking.

The term "polyurea" as used herein refers to materials prepared by reaction of a diisocyanate with a polyamine.

The term "polyurethane" as used herein refers to materials prepared by reaction of a diisocyanate with a polyol.

A "thermoplastic" is generally defined as a material that is capable of softening or melting when heated and of hardening again when cooled. Thermoplastic polymer chains often are not cross-linked or are lightly crosslinked using a chain extender.

A "thermoset" is generally defined as a material that crosslinks or cures via interaction with as crosslinking or curing agent. The crosslinking may be brought about by energy in the form of heat (generally above 200 degrees Celsius), through a chemical reaction (by reaction with a curing agent), or by irradiation. The resulting composition remains rigid when set, and does not soften with heating. Thermosets have this property because the long-chain polymer molecules cross-link with each other to give a rigid structure. A thermoset material cannot be melted and re-molded after it is cured thus thermosets do not lend themselves to recycling unlike thermoplastics, which can be melted and re-molded.

The term "thermoplastic polyurethane" refers to a material prepared by reaction of a prepared by reaction of a diisocyanate with a polyol, and optionally addition of a chain extender.

The term "thermoplastic polyurea" refers to a material prepared by reaction of a prepared by reaction of a diisocyanate with a polyamine, with optionally addition of a chain extender.

The term "thermoset polyurethane" refers to a material prepared by reaction of a diisocyanate with a polyol, and a curing agent.

The term "thermoset polyurea" refers to a material prepared by reaction of a diisocyanate with a polyamine, and a curing agent.

A "urethane prepolymer" is the reaction product of diisocyanate and a polyol.

A "urea prepolymer" is the reaction product of a diisocyanate and a polyamine.

The term "unimodal polymer" refers to a polymer comprising one main fraction and more specifically to the form of the polymer's molecular weight distribution curve, i.e., the molecular weight distribution curve for the total polymer product shows only a single maximum.

The isocyanate-modified composition of the present invention comprises 1) a base polymer and 2) a blocked isocyanate modifier.

The base polymer is a polyol, a polyamine, or a polymer having both hydroxyl and amine functionality, and all mixtures and blends thereof. The blocked isocyanate may be in its pure form or formed as a masterbatch or concentrate by mixing or compounding with an additional polymer to facilitate subsequent blending. Both the base polymer (or polymer blend) and the blocked isocyanate modifier (or masterbatch or concentrate) are both selected and formulated such that prior to mixing they are in the solid state at room temperature.

I. Blocked Isocyanate Modifier

The blocked isocyanate modifier is an adduct formed by reacting an isocyanate (or polymer containing isocyanate functionality), with a so called blocking agent, which is a compound which contains an active hydrogen atom reactive with the isocyanate group. This reaction is reversible and at a certain temperature, the blocking group will cleave from the blocked adduct, liberating free isocyanate. The blocked isocyanate modifier may be mixed directly with the base polymer or added in the form of a masterbatch formed by mixing with a polymeric carrier prior to addition to the base polymer.

The blocking agents which are applicable herein are compounds which contain an acidic active hydrogen atom reactive with the isocyanate group such as phenol, ethyl acetoacetate and ε-caprolactam. The resulting adduct at moderate temperatures will cleave liberating free isocyanate. The unblocking temperature depends upon the structure of the isocyanate and blocking agent. Typically, aromatic isocyanates are unblocked at lower temperatures than those required to unblock aliphatic isocyanates. The dissociation temperature decreases according to the following order of blocking agents: alcohols>lactams>cetoxims>active methylene groups compounds. The reactive hydrogen atoms are commonly attached to oxygen (e.g., hydroxyl groups), sulfur, or nitrogen atoms, however; they may also be attached to carbon atoms which are highly activated by other groups in close proximity therewith. Suitable blocking agents include, for example, ethyl malonate, acetylacetone, ethyl acetoacetate, 1-phenyl-3-methyl-5-pyrazolone, hydroxylamine, thiophenol, ε-caprolactam pyrocatechol, propyl mercaptan, N-methyl aniline, diphenyl amine, phenol, 2,4-diisobutylphenol, methyl ethyl ketoxime, α-pyrrolidone, t-butyl alcohol, ethylene imine, propylene imine, and the like.

The blocked isocyanante modifiers used in the compositions of the present invention can be derived from any isocyanate available to one of ordinary skill in the art. Isocyanates for use with the present invention include, but are not limited to, aliphatic, cycloaliphatic, aromatic aliphatic, aromatic, any derivatives thereof, and combinations of these compounds having two or more isocyanate (NCO) groups per molecule. As used herein, aromatic aliphatic compounds should be understood as those containing an aromatic ring, wherein the isocyanate group is not directly bonded to the ring. One example of an aromatic aliphatic compound is a tetramethylene diisocyanate (TMXDI). The isocyanates may be organic polyisocyanate-terminated prepolymers, low free isocyanate prepolymer, and mixtures thereof. The isocyanate-containing reactable component may also include any isocyanate-functional monomer, dimer, trimer, or polymeric adduct thereof, prepolymer, quasi-prepolymer, or mixtures thereof. Isocyanate-functional compounds may include monoisocyanates or polyisocyanates that include any isocyanate functionality of two or more.

Suitable isocyanate-containing components include diisocyanates having the generic structure: O=C=N—R—N=C=O, where R is preferably a cyclic, aromatic, or linear or branched hydrocarbon moiety containing from about 1 to about 50 carbon atoms. The isocyanate may also contain one or more cyclic groups or one or more phenyl groups. When multiple cyclic or aromatic groups are present, linear and/or branched hydrocarbons containing from about 1 to about 10 carbon atoms can be present as spacers between the cyclic or aromatic groups. In some cases, the cyclic or aromatic group(s) may be substituted at the 2-, 3-, and/or 4-positions, or at the ortho-, meta-, and/or para-positions, respectively. Substituted groups may include, but are not limited to, halogens, primary, secondary, or tertiary hydrocarbon groups, or a mixture thereof.

Examples of isocyanates that can be used with the present invention include, but are not limited to, substituted and isomeric mixtures including 2,2'-, 2,4'-, and 4,4'-diphenylmethane diisocyanate (MDI); 3,3'-dimethyl-4,4'-biphenylene diisocyanate (TODI); toluene diisocyanate (TDI); polymeric MDI; carbodiimide-modified liquid 4,4'-diphenylmethane diisocyanate; para-phenylene diisocyanate (PPDI); metaphenylene diisocyanate (MPDI); triphenyl methane-4,4'- and triphenyl methane-4,4''-triisocyanate; naphthylene-1,5-diisocyanate; 2,4'-, 4,4'-, and 2,2-biphenyl diisocyanate; polyphenylene polymethylene polyisocyanate (PMDI) (also known as polymeric PMDI); mixtures of MDI and PMDI; mixtures of PMDI and TDI; ethylene diisocyanate; propylene-1,2-diisocyanate; trimethylene diisocyanate; butylenes diisocyanate; bitolylene diisocyanate; tolidine diisocyanate; tetramethylene-1,2-diisocyanate; tetramethylene-1,3-diisocyanate; tetramethylene-1,4-diisocyanate; pentamethylene diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; diethylidene diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophorone diisocyanate (IPDI); dimeryl diisocyanate, dodecane-1,12-diisocyanate, 1,10-decamethylene diisocyanate, cyclohexylene-1,2-diisocyanate, 1,10-decamethylene diisocyanate, 1-chlorobenzene-2,4-diisocyanate, furfurylidene diisocyanate, 2,4,4-trimethyl hexamethylene diisocyanate, 2,2,4-trimethyl hexamethylene diisocyanate, dodecamethylene diisocyanate, 1,3-cyclopentane diisocyanate, 1,3-cyclohexane diisocyanate, 1,3-cyclobutane diisocyanate, 1,4-cyclohexane diisocyanate, 4,4'-methylenebis(cyclohexyl isocyanate), 4,4'-methylenebis(phenyl isocyanate), 1-methyl-2,4-cyclohexane diisocyanate, 1-methyl-2,6-cyclohexane diisocyanate, 1,3-bis (isocyanato-methyl)cyclohexane, 1,6-diisocyanato-2,2,4,4-tetra-methylhexane, 1,6-diisocyanato-2,4,4-tetra-trimethylhexane, trans-cyclohexane-1,4-diisocyanate, 3-isocyanato-methyl-3,5,5-trimethylcyclohexyl isocyanate, 1-isocyanato-3,3,5-trimethyl-5-isocyanatomethylcyclohexane, cyclo-hexyl isocyanate, dicyclohexylmethane 4,4'-diisocyanate, 1,4-bis(isocyanatomethyl)cyclohexane, m-phenylene diisocyanate, m-xylylene diisocyanate, m-tetramethylxylylene diisocyanate, p-phenylene diisocyanate, p,p'-biphenyl diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalene diisocyanate, 4-chloro-1,3-phenylene diisocyanate, 1,5-tetrahydronaphthalene diisocyanate, metaxylene diisocyanate, 2,4-toluene diisocyanate, 2,4'-diphenylmethane diisocyanate, 2,4-chlorophenylene diisocyanate, 4,4'-diphenylmethane diisocyanate, p,p'-diphenylmethane diisocyanate, 2,4-tolylene diisocyanate, 2,6-tolylene diisocyanate, 2,2-diphenylpropane-4,4'-diisocyanate, 4,4'-toluidine diisocyanate, dianidine diisocyanate, 4,4'-diphenyl ether diisocyanate, 1,3-xylylene diisocyanate, 1,4-naphthylene diisocyanate, azobenzene-4,4'-diisocyanate, diphenyl sulfone-4,4'-diisocyanate, triphenylmethane 4,4',4''-triisocyanate, isocyanatoethyl methacrylate, 3-isopropenyl-α,α-dimethylbenzyl-isocyanate, dichlorohexamethylene diisocyanate, ω,ω'-diisocyanato-1,4-diethylbenzene, polymethylene polyphenylene polyisocyanate, isocyanurate modified compounds, and carbodiimide modified compounds, as well as biuret modified compounds of the above polyisocyanates.

These isocyanates may be used either alone or in combination. These combination isocyanates include triisocyanates, such as biuret of hexamethylene diisocyanate and triphenylmethane triisocyanates, and polyisocyanates, such as polymeric diphenylmethane diisocyanate.triisocyanate of HDI; triisocyanate of 2,2,4-trimethyl-1,6-hexane diisocyanate (TMDI); 4,4'-dicyclohexylmethane diisocyanate ($H_{12}MDI$); 2,4-hexahydrotoluene diisocyanate; 2,6-hexahydrotoluene diisocyanate; 1,2-, 1,3-, and 1,4-phenylene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, and mixtures thereof, dimerized uretdione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof.

The blocked isocyanates used in the isocyanate-modified compositions of the present invention are selected to have a characteristic temperature sufficiently high such that they will deblock and react only on injection molding of the desired part and not in any earlier mixing or compounding steps prior to final processing. Too low of a characteristic temperature will result in crosslinking of the composition before processing is completed, leading to process difficulties. It is also a requirement of the present invention that the blocked isocyanate (or masterbatch or concentrate containing the blocked isocyanate) should be in the solid state at room temperature.

Particular preferred examples of blocked isocyanates include those marked under the trade name CRELAN by Bayer Corporation. Examples of those include: CRELAN TP LS 2147; CRELAN NI 2; isophorone diisocyanate (IPDI)-based uretdione-type crosslinker, such as CRELAN VP LS 2347; a combination of a uretdione adduct of IPDI and a partially ε-caprolactam-modified IPDI, such as CRELAN VP 2386; a combination of isocyanate adducts modified by ε-caprolactam and a carboxylic acid functional group, such as CRELAN VP LS 2181/1; a caprolactam-modified Desmodur diisocyanate, such as CRELAN NW5; and a Desmodur diisocyanate having a 3,5-dimethylpyrazole modified isocyanate, such as CRELAN XP 7180. These blocked isocyanates may be used either alone or in combination. Such blocked diisocyanates are described in more detail in U.S. Pat. No. 6,939,924, the entire contents of which are hereby incorporated by reference.

II. Base Polymer Comprising Solid Polyol, Sold Polyamine or a Solid Polymer Containing Both Hydroxyl and Amine Functionality Any polyol or polyamine available to one of ordinary skill in the polyurethane or polyurea art is suitable for use as the base polymer according to the invention, provided the polyol or polyamine base polymer or the blend composition comprising the base polymer is a solid at room temperature.

Polyols suitable for use in the compositions of the present invention include, but are not limited to, polyester polyols, polyether polyols, polycarbonate polyols and polydiene polyols such as polybutadiene polyols.

Polyester polyols are prepared by condensation or step-growth polymerization utilizing diacids. Primary diacids for polyester polyols are adipic acid and isomeric phthalic acids. Adipic acid is used for materials requiring added flexibility, whereas phthalic anhydride is used for those requiring rigidity. Some examples of polyester polyols include poly(ethylene adipate) (PEA), poly(diethylene adipate) (PDA), poly(propylene adipate) (PPA), poly(tetramethylene adipate) (PBA), poly(hexamethylene adipate) (PHA), poly(neopentylene adipate) (PNA), polyols composed of 3-methyl-1,5-pentanediol and adipic acid, random copolymer of PEA and PDA, random copolymer of PEA and PPA, random copolymer of PEA and PBA, random copolymer of PHA and PNA, caprolactone polyol obtained by the ring-opening polymerization of ε-caprolactone, and polyol obtained by opening the ring of β-methyl-δ-valerolactone with ethylene glycol can be used either alone or in a combination thereof. Additionally, polyester polyol may be composed of a copolymer of at least one of the following acids and at least one of the following glycols. The acids include terephthalic acid, isophthalic acid, phthalic anhydride, oxalic acid, malonic acid, succinic acid, pentanedioic acid, hexanedioic acid, octanedioic acid, nonanedioic acid, adipic acid, azelaic acid, sebacic acid, dodecanedioic acid, dimer acid (a mixture), ρ-hydroxybenzoate, trimellitic anhydride, ε-caprolactone, and β-methyl-δ-valerolactone. The glycols includes ethylene glycol, propylene glycol, butylene glycol, pentylene glycol, 1,4-butanediol, 1,5-pentanediol, 1,6-hexanediol, neopentylene glycol, polyethylene glycol, polytetramethylene glycol, 1,4-cyclohexane dimethanol, pentaerythritol, and 3-methyl-1,5-pentanediol.

Polyether polyols are prepared by the ring-opening addition polymerization of an alkylene oxide (e.g. ethylene oxide and propylene oxide) with an initiator of a polyhydric alcohol (e.g. diethylene glycol), which is an active hydride. Specifically, polypropylene glycol (PPG), polyethylene glycol (PEG) or propylene oxide-ethylene oxide copolymer can be obtained. Polytetramethylene ether glycol (PTMG) is prepared by the ring-opening polymerization of tetrahydrofuran, produced by dehydration of 1,4-butanediol or hydrogenation of furan. Tetrahydrofuran can form a copolymer with alkylene oxide. Specifically, tetrahydrofuran-propylene oxide copolymer or tetrahydrofuran-ethylene oxide copolymer can be formed. The polyether polyol may be used either alone or in a combination.

Polycarbonate polyol is obtained by the condensation of a known polyol (polyhydric alcohol) with phosgene, chloroformic acid ester, dialkyl carbonate or diallyl carbonate. Particularly preferred polycarbonate polyol contains a polyol component using 1,6-hexanediol, 1,4-butanediol, 1,3-butanediol, neopentylglycol or 1,5-pentanediol. Polycarbonate polyols can be used either alone or in a combination with other polyols.

Polydiene polyol may be composed of diene polymer or diene copolymer or a copolymer of such diene with addition to polymerizable α-olefin monomer having 2 to 2.2 carbon atoms. Specific examples include butadiene homopolymer, isoprene homopolymer, butadiene-styrene copolymer, butadiene-isoprene copolymer, butadiene-acrylonitrile copolymer, butadiene-2-ethyl hexyl acrylate copolymer, and butadiene-n-octadecyl acrylate copolymer. These diene polymers can be obtained, for example, by heating a conjugated diene monomer in the presence of hydrogen peroxide in a liquid reactant.

An especially preferred polyol for use as the base polymer in the compositions of the present invention are the family of ethylene-vinyl alcohol copolymers ("EVAL"), which are often prepared by saponifying or hydrolyzing an ethylene-vinyl acetate copolymer. Also included are the family of ethylene/vinyl alcohol co-polymer ("EVOH") which have been chemically modified to induce the formation of ionic clusters by grafting —COOH containing pendant groups on the polymer backbone which may also be subsequently partially or totally neutralized and whereby, the presence of ionic couples increases the compatibility towards other polymers as compared to EVOH. These materials are more fully described by M. A. Del Nobile in Packaging Technology and Science, vol 10 (No. 2), pages 95-108, (ed John Wiley & Sons, Ltd. 1997).

The ethylene-vinyl alcohol polymers generally have an ethylene content of 10-90, preferably 25 to 75 mole percent. It is preferred that the percent ethylene in the EVAL is at least 45 percent. The degree of hydrolysis should react at least 96 percent, preferably at least 99 percent.

Any polyamine available to one of ordinary skill in the polyurea art is suitable for use as the base polymer according to the invention provided the polyamine or blend composition comprising the polyamine is a solid at room temperature. Preferably the polyamine compound is selected from the group consisting of amine-terminated hydrocarbons, amine-terminated polyethers, amine-terminated polyesters, amine-terminated polycaprolactones, amine-terminated polycarbonates, amine-terminated polyamides, and mixtures thereof. The amine-terminated compound may be a polyether amine selected from the group consisting of polytetramethylene ether diamines, polyoxypropylene diamines, poly(ethylene oxide capped oxypropylene) ether diamines, triethyleneglycoldiamines, propylene oxide-based triamines, trimethylolpropane-based triamines, glycerin-based triamines, and mixtures thereof.

Especially preferred amines are MDA (4,4'-methylene dianiline), 1,12-dodecanediamine, acetoguanamine (6-methyl-1,3,5-triazine-2,4-diamine), benzoguanamine, its derivative of guanamine.

Also included as the base polymer component of the present invention are polymers having both amine and hydroxy functionality or blends thereof. One such material is the linear polysaccharide chitosan which is composed of randomly distributed β-(1-4)-linked D-glucosamine and N-acetyl-D-glucosamine. Chitosan is produced commercially by deacetylation by chitin so it has both of a primary hydroxyl and primary amine groups. Commercially available chitosan has from 60% to 100% of the degree of deacetylation. Particularly preferred the degree of deacetylation on chitosan is above 70%.

Polymers which may be compounded with the blocked isocyanate to form a masterbatch, or blended with the base polymer component, may be any polymeric material generally considered useful for making golf balls according to the process of the present invention. Typically a material to be compounded with the blocked isocyanate is chosen on the basis of its compatibility with the blocked isocyanate, including both its miscibility and reactivity (such that no or minimal deblocking occurs on compounding) and with the proviso that the final compound or masterbatch should be a solid at room temperature.

Similarly a material to be blended with the base polymer is also chosen on the basis of its compatibility with the base polymer and must have correct miscibility and mixing profile to result in even dispersion and again with the proviso that the final base polymer blend should be a solid at room temperature. An additional consideration is that the material to be blended with the base polymer is also selected such that the resulting blend have a certain hardness in order to generate the required hardness in the final part molded from the isocyanate-modified composition of the present invention.

Suitable polymers which may be used to either compound with the blocked isocyanate to form a masterbatch, or to blend with the base polymer component include, without limitation, synthetic and natural rubbers, thermoset polymers such as other thermoset polyurethanes or thermoset polyureas, as well as thermoplastic polymers including thermoplastic elastomers such as metallocene catalyzed polymer, unimodal ethylene/carboxylic acid copolymers, unimodal ethylene/carboxylic acid/carboxylate terpolymers, bimodal ethylene/carboxylic acid copolymers, bimodal ethylene/carboxylic acid/carboxylate terpolymers, unimodal ionomers, bimodal ionomers, modified unimodal ionomers, modified bimodal ionomers, thermoplastic polyurethanes, thermoplastic polyureas, polyamides, copolyamides, polyesters, copolyesters, polycarbonates, polyolefins, halogenated (e.g. chlorinated) polyolefins, halogenated polyalkylene compounds, such as halogenated polyethylene [e.g. chlorinated polyethylene (CPE)], polyalkenamer, polyphenylene oxides, polyphenylene sulfides, diallyl phthalate polymers, polyimides, polyvinyl chlorides, polyamide-ionomers, polyurethane-ionomers, polyvinyl alcohols, polyarylates, polyacrylates, polyphenylene ethers, impact-modified polyphenylene ethers, polystyrenes, high impact polystyrenes, acrylonitrile-butadiene-styrene copolymers, styrene-acrylonitriles (SAN), acrylonitrile-styrene-acrylonitriles, styrene-maleic anhydride (S/MA) polymers, styrenic copolymers, functionalized styrenic copolymers, functionalized styrenic terpolymers, styrenic terpolymers, cellulosic polymers, liquid crystal polymers (LCP), ethylene-propylene-diene terpolymers (EPDM), ethylene-vinyl acetate copolymers (EVA), ethylene-propylene copolymers, ethylene vinyl acetates, polyureas, and polysiloxanes and any and all combinations thereof.

Examples of preferred blend polymers for EVAL-based masterbatches include but are not limited to ethylene/(meth-acrylic) acid/esters and terpolymers for example the family of NUCREL polymers commercially available from E.I. DuPont de Nemours & Co., as well as the ethylene/ethyl hexyl acrylate copolymer such as the family of Lotryl polymers commercially available from Arkema.

III. Method of Making the Isocyanate-Modified Compositions of the Present Invention The base polymer, base polymer blend, blocked isocyanate, or blocked isocyanate masterbatch, as well as the final isocyanate-modified compositions of the present invention, may be produced by mixing by any suitable method. For example, the individual components may be mixed using a twin-screw extruder either with or without melting them, or by blending manually or mechanically prior to the addition to the injection molder feed hopper. Dry blending equipment, such as a tumble mixer, V-blender, ribbon blender, or two-roll mill, can be used to mix the compositions. The base polymer, base polymer blend, blocked isocyanate, blocked isocyanate masterbatch as well as the final isocyanate-modified compositions of the present invention can also be mixed using a mill, internal mixer such as a Banbury or Farrel continuous mixer, extruder or combinations of these, with or without application of thermal energy to produce melting with the proviso that any thermal energy applied to the blocked isocyanate, or blocked isocyanate masterbatch be insufficient to promote deblocking of the blocked isocyanate.

IV. Properties of the Isocyanate-Modified Compositions of the Present Invention

The isocyanate-modified compositions of the present invention comprise:

1) from about 65 to about 99, preferably from about 70 to about 98, more preferably from about 75 to about 97, and most preferably from about 85 to about 95 weight % (based on the total weight of the isocyanate-modified composition) of a base polymer having either hydroxyl groups or amine groups or mixtures thereof; and 2) from about 1 to about 35, preferably from about 2 to about 30, more preferably from about 3 to about 25, and most preferably from about 5 to about 15 weight % (based on the total weight of the isocyanate-modified composition) of a blocked isocyanate The base polymer (or base polymer blend) used to prepare the isocyanate-modified compositions of the present invention has a glass transition temperature of $\geq -80°$ C., preferably $\geq -75°$ C., more preferably $\geq -70°$ C., and most preferably $\geq -65°$ C.

The base polymer (or base polymer blend) used to prepare the isocyanate-modified compositions of the present invention has a melting temperature of $\geq 40°$ C., preferably $\geq 50°$ C., more preferably $\geq 60°$ C., and most preferably $\geq 70°$ C.

The base polymer (or base polymer blend) used to prepare the isocyanate-modified compositions of the present invention has a Shore A hardness of $\geq 60A$, preferably $\geq 80A$, more preferably $\geq 90A$, and most preferably $\geq 95A$.

The unblocking temperature of blocked isocyanates used to prepare the isocyanate-modified compositions of the present invention typically is $\geq 100°$ C., preferably $\geq 120°$ C., more preferably $\geq 140°$ C., and most preferably $\geq 160°$ C.

The flexural modulus after injection molding the isocyanate-modified compositions of the present invention is from about 0.1 to about 300 kpsi, preferably from about 0.5 top about 150 kpsi, more preferably from about 1 to about 100 kpsi, and most preferably from about 2 to about 50 kpsi.

V. Processing the Isocyanate-Modified Compositions of the Present Invention

Any article typically prepared from a polymer using a conventional injection molding process may be formed using the isocyanate-modified compositions of the present invention, which can thus be used to manufacturing a wide variety of parts, from the smallest component to their facia and even entire body panels of cars as well as other commonly made items including but not limited to bottle caps, outdoor furniture, shoe soles, and golf balls.

An additional feature of the isocyanate-modified compositions of the present invention is that the degree of thermoset or thermoplastic-like mechanical properties of the final part can be controlled not only by selection of the blocked isocyanate and the base polymer or polymer blend but also by the ratio of blocked isocyanate to the base polymer coupled with the time and temperature of the injection molding process, with the proviso that the thermal energy applied during molding of the final isocyanate-modified compositions of the present invention be sufficient to promote the desired amount of deblocking of the blocked isocyanate and enable reaction with the base polymer.

One preferred finished article is a golf ball comprising a core one or more intermediate layers and an outer cover layer, any or all of which can comprise the isocyanate-modified compositions of the present invention. In a preferred embodiment one or more of the golf ball intermediate layers comprises the isocyanate-modified compositions of the present invention, and in a most preferred embodiment the outer cover layer of the golf ball comprises the isocyanate-modified compositions of the present invention.

Finished golf balls may be prepared by initially positioning the solid preformed core or mantled core in an injection-molding cavity followed by uniform injection of the intermediate and/or cover layer composition comprising the isocyanate-modified composition of the present invention sequentially over the core. The cover formulations can be injection molded around the cores to produce golf balls of the required diameter.

Alternatively, the cover layers may also be formed around the core by first forming half shells by injection molding comprising the isocyanate-modified composition of the present invention followed by compression molding the half shells about the core or mantled core to form the golf ball.

In addition to the isocyanate-modified compositions of the present invention the golf ball core, intermediate layers or outer cover layer may comprise other polymer components. For example, if the golf ball outer cover layer comprises the isocyanate modified compositions of the present invention, the other golf ball components such as the core and intermediate layers may comprise, in addition to the isocyanate modified compositions of the present invention, other polymers used to make such golf ball components.

These include, without limitation, synthetic and natural rubbers, thermoset polymers such as other thermoset polyurethanes or thermoset polyureas, as well as thermoplastic polymers including thermoplastic elastomers such as metallocene catalyzed polymer, unimodal ethylene/carboxylic acid copolymers, unimodal ethylene/carboxylic acid/carboxylate terpolymers, bimodal ethylene/carboxylic acid copolymers, bimodal ethylene/carboxylic acid/carboxylate terpolymers, unimodal ionomers, bimodal ionomers, modified unimodal ionomers, modified bimodal ionomers, thermoplastic polyurethanes, thermoplastic polyureas, polyamides, copolyamides, polyesters, copolyesters, polycarbonates, polyolefins, halogenated (e.g. chlorinated) polyolefins, halogenated polyalkylene compounds, such as halogenated polyethylene [e.g. chlorinated polyethylene (CPE)], polyalkenamer, polyphenylene oxides, polyphenylene sulfides, diallyl phthalate polymers, polyimides, polyvinyl chlorides, polyamide-ionomers, polyurethane-ionomers, polyvinyl alcohols, polyarylates, polyacrylates, polyphenylene ethers, impact-modified polyphenylene ethers, polystyrenes, high impact polystyrenes, acrylonitrile-butadiene-styrene copolymers, styrene-acrylonitriles (SAN), acrylonitrile-styrene-acrylonitriles, styrene-maleic anhydride (S/MA) polymers, styrenic copolymers, functionalized styrenic copolymers, functionalized styrenic terpolymers, styrenic terpolymers, cellulosic polymers, liquid crystal polymers (LCP), ethylene-propylene-diene terpolymers (EPDM), ethylene-vinyl acetate copolymers (EVA), ethylene-propylene copolymers, ethylene vinyl acetates, polyureas, and polysiloxanes and any and all combinations thereof.

More specific examples of particular polymeric materials useful for making golf ball cores, optional intermediate layer(s) and outer covers, again without limitation, are provided below.

Examples of olefinic thermoplastic elastomers include, without limitation, metallocene-catalyzed polyolefins, ethylene-octene copolymers, ethylene-butene copolymers, and ethylene-propylene copolymers all with or without controlled tacticity as well as blends of polyolefins having ethyl-propylene-non-conjugated diene terpolymers, rubber-based copolymers, and dynamically vulcanized rubber-based copolymers. Examples of such polymers that are commercially available include products sold under the trade names SANTOPRENE, DYTRON, VISTAFLEX, and VYRAM by Advanced Elastomeric Systems of Houston, Tex., and SARLINK by DSM of Haarlen, the Netherlands.

Examples of copolyester thermoplastic elastomers include polyether ester block copolymers, polylactone ester block copolymers, and aliphatic and aromatic dicarboxylic acid copolymerized polyesters. Blends of aromatic polyester and aliphatic polyester also may be used for these. Examples of these include products marketed under the trade names HYTREL by E.I. DuPont de Nemours & Company, and SKYPEL by S.K. Chemicals of Seoul, South Korea.

Examples of other thermoplastic elastomers include multi-block, rubber-based copolymers, particularly those in which the rubber block component is based on butadiene, isoprene, or ethylene/butylene. The non-rubber repeating units of the copolymer may be derived from any suitable monomer, including meth(acrylate) esters, such as methyl methacrylate and cyclohexylmethacrylate, and vinyl arylenes, such as styrene. Styrenic block copolymers are copolymers of styrene with butadiene, isoprene, or a mixture of the two. Additional unsaturated monomers may be added to the structure of the styrenic block copolymer as needed for property modification of the resulting SBC/urethane copolymer. The styrenic block copolymer can be a diblock or a triblock styrenic polymer. Examples of such styrenic block copolymers are described in, for example, U.S. Pat. No. 5,436,295 to Nishikawa et al., which is incorporated herein by reference. Examples of styrenic copolymers include, without limitation, resins manufactured by Kraton Polymers (formerly of Shell Chemicals) under the trade names KRATON D (for styrene-butadiene-styrene and styrene-isoprene-styrene types), and KRATON G (for styrene-ethylene-butylene-styrene and styrene-ethylene-propylene-styrene types) and Kuraray under the trade name SEPTON.

Examples of other thermoplastic elastomers suitable as additional polymer components in the present invention include those having functional groups, such as carboxylic acid, maleic anhydride, glycidyl, norbornene, and hydroxyl functionalities. An example of these includes a block polymer having at least one polymer block A comprising an aromatic vinyl compound and at least one polymer block B comprising a conjugated diene compound, and having a hydroxyl group at the terminal block copolymer, or its hydrogenated product. An example of this polymer is sold under the trade name SEPTON HG-252 by Kuraray Company of Kurashiki, Japan. Other examples of these include: maleic anhydride functionalized triblock copolymer consisting of polystyrene end blocks and poly(ethylene/butylene), sold under the trade name KRATON FG 1901X by Shell Chemical Company; maleic anhydride modified ethylene-vinyl acetate copolymer, sold under the trade name FUSABOND by E.I. DuPont de Nemours & Company; ethylene-isobutyl acrylate-methacrylic acid terpolymer, sold under the trade name NUCREL by E.I. DuPont de Nemours & Company; ethylene-ethyl acrylate-methacrylic anhydride terpolymer, sold under the trade name BONDINE AX 8390 and 8060 by Sumitomo Chemical Industries; brominated styrene-isobutylene copolymers sold under the trade name BROMO XP-50 by Exxon Mobil Corporation; and resins having glycidyl or maleic anhydride functional groups sold under the trade name LOTADER by Elf Atochem of Puteaux, France.

In addition to the compositions of the present invention, the, outer cover and/or one or intermediate layers of the golf ball may comprise one or more ionomer resins. One family of such resins was developed in the mid-1960s by E.I. DuPont de Nemours and Co., and sold under the trademark SURLYN®. Preparation of such ionomers is well known. See, for example, U.S. Pat. No. 3,264,272, which is incorporated herein by reference. Generally speaking, most commercial ionomers are unimodal and consist of a polymer of a mono-olefin, e.g., an alkene, with an unsaturated mono- or dicarboxylic acid having from about 3 to about 12 carbon atoms. An additional monomer in the form of a mono- or dicarboxylic acid ester may also be incorporated in the formulation as a so-called "softening comonomer". The incorporated carboxylic acid groups are then neutralized by a basic metal ion salt, to form the ionomer. The metal cations of the basic metal ion salt used for neutralization include $Li^+$, $Na^+$, $K^+$, $Zn^{2+}$, $Ca^{2+}$, $Co^{2+}$, $Ni^{2+}$, $Cu^{2+}$, $Pb^{2+}$, and $Mg^{2+}$, with the $Li^+$, $Na^+$, $Ca^{2+}$, $Zn^{2+}$, and $Mg^{2+}$ being preferred. The basic metal ion salts include those of for example formic acid, acetic acid, nitric acid, and carbonic acid, hydrogen carbonate salts, oxides, hydroxides, and alkoxides.

The first commercially available ionomer resins contained up to 16 weight percent acrylic or methacrylic acid, although it was also well known at that time that, as a general rule, the hardness of these cover materials could be increased with increasing acid content. Hence, in Research Disclosure 29703, published in January 1989, DuPont disclosed ionomers based on ethylene/acrylic acid or ethylene/methacrylic acid containing acid contents of greater than 15 weight percent. Ionomer resins with acrylic or methacrylic acid units present from 16 wt. % to about 35 wt. % in the polymer are now available. Generally, such a high acid ionomer will have a flexural modulus from about 50,000 psi to about 125,000 psi. The ionomer resins which further comprise a softening comonomer, present from about 10 wt. % to about 50 wt. % in the polymer, have a flexural modulus from about 2,000 psi to about 10,000 psi, and are sometimes referred to as "soft" or "very low modulus" ionomers. Typical softening comonomers include n-butyl acrylate, iso-butyl acrylate, n-butyl methacrylate, methyl acrylate and methyl methacrylate.

The full range of commercially available ionomers typically includes ionomers of polymers of general formula, E/X/Y polymer, wherein E is ethylene, X is a $C_3$ to $C_8$ $\alpha,\beta$ ethylenically unsaturated carboxylic acid, such as acrylic or methacrylic acid, and is present in an amount from about 2 to about 30 weight % of the E/X/Y copolymer, and Y is a softening comonomer selected from the group consisting of alkyl acrylate and alkyl methacrylate, such as methyl acrylate or methyl methacrylate, and wherein the alkyl groups have from 1-8 carbon atoms, Y is in the range of 0 to about 50 weight % of the E/X/Y copolymer, and wherein the acid groups are neutralized from about 1% to about 100% to form an ionomer with a cation such as lithium, sodium, potassium, magnesium, calcium, barium, lead, tin, zinc or aluminum, or a combination of such cations.

The ionomer may also be a so-called bimodal ionomer as described in U.S. Pat. No. 6,562,906 (the entire contents of which are herein incorporated by reference). These ionomers are bimodal as they are prepared from blends comprising polymers of different molecular weights.

In addition to the unimodal and bimodal ionomers, also included are the so-called "modified ionomers" examples of which are described in U.S. Pat. Nos. 6,100,321, 6,329,458 and 6,616,552 and U.S. Patent Publication No. US 2003/0158312 A1, the entire contents of all of which are herein incorporated by reference.

The modified unimodal and bimodal ionomers, include ionomers derived from the earlier described bimodal ethylene/carboxylic acid polymers (as described in U.S. Pat. No. 6,562,906, the entire contents of which are herein incorporated by reference), which are modified by the addition of fatty or waxy acid salts composed of a chain of alkyl groups containing from about 4 to 75 carbon atoms (usually even numbered) and characterized by a —COOH terminal group. Examples of suitable saturated fatty acids, i.e., fatty acids in which the carbon atoms of the alkyl chain are connected by single bonds, include but are not limited to stearic acid ($C_{18}$, i.e., $CH_3(CH_2)_{16}COOH$), palmitic acid ($C_{16}$, i.e., $CH_3(CH_2)_{14}COOH$), pelargonic acid ($C_9$, i.e., $CH_3(CH_2)_7COOH$) and lauric acid ($C_{12}$, i.e., $CH_3(CH_2)_{10}OCOOH$). Examples of suitable unsaturated fatty acids, i.e., a fatty acid in which there are one or more double bonds between the carbon atoms in the alkyl chain, include but are not limited to oleic acid ($C_{13}$, i.e., $CH_3(CH_2)_7CH:CH(CH_2)_7COOH$).

The source of the metal ions used to produce the metal salts of the fatty or waxy acid salts used in the various modified ionomers are generally various metal salts which provide the metal ions capable of neutralizing, to various extents, the carboxylic acid groups of the fatty acids. These include the sulfate, carbonate, acetate and hydroxylate salts of zinc, barium, calcium and magnesium. Since the fatty acid salts modifiers comprise various combinations of fatty acids neutralized with a large number of different metal ions, several different types of fatty acid salts may be utilized in the invention, including metal stearates, laureates, oleates, and palmitates, with calcium, zinc, sodium, lithium, potassium and magnesium stearate being preferred, and calcium and sodium stearate being most preferred. An example of such a modified ionomer polymer is DuPont® HPF-1000 available from E. I. DuPont de Nemours and Co. Inc.

A "specialty propylene elastomer" includes a thermoplastic propylene-ethylene copolymer composed of a majority amount of propylene and a minority amount of ethylene. These copolymers have at least partial crystallinity due to adjacent isotactic propylene units. One example of illustrative specialty propylene elastomers is described in U.S. Pat. No. 6,525,157, to Kim et al., the entire contents of which is hereby incorporated by reference in its entirety. Specialty propylene elastomers are commercially available under the tradename VISTAMAXX from ExxonMobil Chemical.

In yet another embodiment, a blend of an ionomer and a block copolymer can be included in the composition that includes the specialty propylene elastomer. Such blends are described in more detail in commonly-assigned U.S. Pat. No. 6,861,474 and U.S. Patent Publication No. US 2003/0224871 both of which are incorporated herein by reference in their entireties.

In a further embodiment, the core, mantle and/or cover layers (and particularly the outer cover layer) can comprise a composition prepared by blending together at least three materials, identified as Components A, B, and C, and melt-processing these components to form in-situ, a polymer blend composition incorporating a pseudo-crosslinked polymer network. Such blends are described in more detail in commonly-assigned U.S. Pat. No. 6,930,150, to Kim et al., the content of which is incorporated by reference herein in its entirety.

Illustrative polyamides for use in the compositions/golf balls disclosed include those obtained by: (1) polycondensation of (a) a dicarboxylic acid, such as oxalic acid, adipic acid, sebacic acid, terephthalic acid, isophthalic acid, or 1,4-cyclohexanedicarboxylic acid, with (b) a diamine, such as ethylenediamine, tetramethylenediamine, pentamethylenediamine, hexamethylenediamine, decamethylenediamine, 1,4-cyclohexyldiamine or m-xylylenediamine; (2) a ring-opening polymerization of cyclic lactam, such as ε-caprolactam or ω-laurolactam; (3) polycondensation of an aminocarboxylic acid, such as 6-aminocaproic acid, 9-aminononanoic acid, 11-aminoundecanoic acid or 12-aminododecanoic acid; (4) copolymerization of a cyclic lactam with a dicarboxylic acid and a diamine; or any combination of (1)-(4). In certain examples, the dicarboxylic acid may be an aromatic dicarboxylic acid or a cycloaliphatic dicarboxylic acid. In certain examples, the diamine may be an aromatic diamine or a cycloaliphatic diamine. Specific examples of suitable polyamides include polyamide 6; polyamide 11; polyamide 12; polyamide 4,6; polyamide 6,6; polyamide 6,9; polyamide 6,10; polyamide 6,12; polyamide MXD6; PA12, CX; PA12, IT; PPA; PA6, IT; and PA6/PPE.

The polyamide may be any homopolyamide or copolyamide. One example of a group of suitable polyamides is thermoplastic polyamide elastomers. Thermoplastic polyamide elastomers typically are copolymers of a polyamide and polyester or polyether. For example, the thermoplastic polyamide elastomer can contain a polyamide (Nylon 6, Nylon 66, Nylon 11, Nylon 12 and the like) as a hard segment and a polyether or polyester as a soft segment. In one specific example, the thermoplastic polyamides are amorphous copolyamides based on polyamide (PA 12).

More specifically, the polyamide elastomer can be prepared by polycondensation of the components (i) a diamine and a dicarboxylate, lactams or an amino dicarboxylic acid (PA component), (ii) a polyoxyalkylene glycol such as polyoxyethylene glycol, polyoxy propylene glycol (PG component) and (iii) a dicarboxylic acid. Suitable amide block polyethers include those as disclosed in U.S. Pat. Nos. 4,331,786; 4,115,475; 4,195,015; 4,839,441; 4,864,014; 4,230,848 and 4,332,920.

One type of polyetherester elastomer is the family of Pebax, which are available from Elf-Atochem Company. Preferably, the choice can be made from among Pebax 2533, 3533, 4033, 1205, 7033 and 7233. Blends or combinations of Pebax 2533, 3533, 4033, 1205, 7033 and 7233 can also be prepared, as well.

Some examples of suitable polyamides for use include those commercially available under the trade names PEBAX, CRISTAMID and RILSAN marketed by Atofina Chemicals of Philadelphia, Pa., GRIVORY and GRILAMID marketed by EMS Chemie of Sumter, S.C., TROGAMID and VESTAMID available from Degussa, and ZYTEL marketed by E.I. DuPont de Nemours & Co., of Wilmington, Del.

The golf balls of the present invention may also include the traditional rubber components used in golf ball applications including, both natural and synthetic rubbers, such as cis-1, 4-polybutadiene, trans-1,4-polybutadiene, 1,2-polybutadiene, cis-polyisoprene, trans-polyisoprene, polychloroprene, polybutylene, styrene-butadiene rubber, styrene-butadiene-styrene block copolymer and partially and fully hydrogenated equivalents, styrene-isoprene-styrene block copolymer and partially and fully hydrogenated equivalents, nitrile rubber, silicone rubber, and polyurethane, as well as mixtures of these. Polybutadiene rubbers, especially 1,4-polybutadiene rubbers containing at least 40 mol %, and more preferably 80 to 100 mol % of cis-1,4 bonds, are preferred because of their high rebound resilience, moldability, and high strength after vulcanization. The polybutadiene component may be synthesized by using rare earth-based catalysts, nickel-based catalysts, or cobalt-based catalysts, conventionally used in this field. Polybutadiene obtained by using lanthanum rare earth-based catalysts usually employ a combination of a lanthanum rare earth (atomic number of 57 to 71)-compound, but particularly preferred is a neodymium compound.

The golf balls of the present invention may also include polyalkenamers. Examples of suitable polyalkenamer rubbers are polypentenamer rubber, polyheptenamer rubber, polyoctenamer rubber, polydecenamer rubber and polydodecenamer rubber. For further details concerning polyalkenamer rubber, see *Rubber Chem. & Tech.*, Vol. 47, page 511-596, 1974, which is incorporated herein by reference. The polyalkenamers may be prepared by ring opening metathesis polymerization of one or more cycloalkenes in the presence of organometallic catalysts as described in U.S. Pat. Nos. 3,492,245, and 3,804,803, the entire contents of both of which are herein incorporated by reference.

Polyoctenamer rubbers are commercially available from Huls AG of Marl, Germany, and through its distributor in the U.S., Creanova Inc. of Somerset, N.J., and sold under the trademark VESTENAMER®. Two grades of the VEST- ENAMER® trans-polyoctenamer are commercially available: VESTENAMER 8012 designates a material having a trans-content of approximately 80% (and a cis-content of 20%) with a melting point of approximately 54° C.; and VESTENAMER 6213 designates a material having a trans-content of approximately 60% (cis-content of 40%) with a melting point of approximately 30° C. Both of these polymers have a double bond at every eighth carbon atom in the ring. The polyalkenamer rubbers used in the present disclosure are disclosed in copending U.S. application Ser. No. 11/335,070, filed on Jan. 18, 2006, in the name of Hyun Kim et al., the entire contents of which are hereby incorporated by reference.

A more preferred composition for use in the golf balls of the present invention and preferably for use in the golf ball core or intermediate layers is a blend of polyalkenamer and polyamide as also disclosed in copending U.S. application Ser. No. 11/335,070, filed on Jan. 18, 2006, in the name of Hyun Kim et al., the entire contents of which are hereby incorporated by reference.

When synthetic rubbers such as the aforementioned polybutadienes or polyalkenamers and their blends are used in the golf balls of the present invention they may contain further materials typically often used in rubber formulations including crosslinking agents, co-crosslinking agents, peptizers and accelerators.

Suitable cross-linking agents for use in the golf balls of the present invention include peroxides, sulfur compounds, or other known chemical cross-linking agents, as well as mixtures of these. Non-limiting examples of suitable cross-linking agents include primary, secondary, or tertiary aliphatic or aromatic organic peroxides. Peroxides containing more than one peroxy group can be used, such as 2,5-dimethyl-2,5-di(tert-butylperoxy)hexane and 1,4-di-(2-tert-butyl peroxyisopropyl)benzene. Both symmetrical and asymmetrical peroxides can be used, for example, tert-butyl perbenzoate and tert-butyl cumyl peroxide. Peroxides incorporating carboxyl groups also are suitable. Non-limiting examples of suitable peroxides include: diacetyl peroxide; di-tert-butyl peroxide; dibenzoyl peroxide; dicumyl peroxide; 2,5-dimethyl-2,5-di(benzoylperoxy)hexane; 1,4-bis-(t-butylperoxyisopropyl)benzene; t-butylperoxybenzoate; 2,5-dimethyl-2,5-di-(t-butylperoxy)hexyne-3, such as Trigonox 145-45B, marketed by Akrochem Corp. of Akron, Ohio; 1,1-bis(t-butylperoxy)-3,3,5 tri-methylcyclohexane, such as Varox 231-XL, marketed by R.T. Vanderbilt Co., Inc. of Norwalk, Conn.; and di-(2,4-dichlorobenzoyl)peroxide. Two or more cross-linking agents having different characteristic decomposition temperatures at the same $t_{1/2}$ may be blended in the composition.

Besides the use of chemical cross-linking agents, exposure of the composition to radiation also can serve as a cross-linking agent. Radiation can be applied to the unsaturated polymer mixture by any known method, including using microwave or gamma radiation, or an electron beam device. Additives may also be used to improve radiation curing of the diene polymer.

The rubber and cross-linking agent may be blended with a co-cross-linking agent, which may be a metal salt of an unsaturated carboxylic acid. Examples of these include zinc and magnesium salts of unsaturated fatty acids having 3 to 8 carbon atoms, such as acrylic acid, methacrylic acid, maleic acid, and fumaric acid, palmitic acid with the zinc salts of acrylic and methacrylic acid being most preferred. The unsaturated carboxylic acid metal salt can be blended in a rubber either as a preformed metal salt, or by introducing an α,β-unsaturated carboxylic acid and a metal oxide or hydroxide into the rubber composition, and allowing them to react in the rubber composition to form a metal salt. The unsaturated carboxylic acid metal salt can be blended in any desired amount, but preferably in amounts of about 10 parts to about 60 parts by weight of the unsaturated carboxylic acid per 100 parts by weight of the synthetic rubber.

The rubber compositions used in the present invention may also incorporate one or more of the so-called "peptizers". The peptizer preferably comprises an organic sulfur compound and/or its metal or non-metal salt. Examples of such organic sulfur compounds include thiophenols, such as pentachlorothiophenol, 4-butyl-o-thiocresol, 4 t-butyl-p-thiocresol, and 2-benzamidothiophenol; thiocarboxylic acids, such as thiobenzoic acid; 4,4' dithio dimorpholine; and, sulfides, such as dixylyl disulfide, dibenzoyl disulfide; dibenzothiazyl disulfide; di(pentachlorophenyl) disulfide; dibenzamido diphenyldisulfide (DBDD), and alkylated phenol sulfides, such as VULTAC marketed by Atofina Chemicals, Inc. of Philadelphia, Pa. Preferred organic sulfur compounds include pentachlorothiophenol, and dibenzamido diphenyldisulfide. Examples of the metal salt of such organic sulfur compound include sodium, potassium, lithium, magnesium calcium, barium, cesium and zinc salts of the above-mentioned thiophenols and thiocarboxylic acids, with the zinc salt of pentachlorothiophenol being most preferred. Examples of the non-metal salt of an organic sulfur compound include ammonium salts of the above-mentioned thiophenols and thiocarboxylic acids wherein the ammonium cation has the general formula $[NR^1R^2R^3R^4]^+$ where $R^1$, $R^2$, $R^3$ and $R^4$ are selected from the group consisting of hydrogen, a $C_1$-$C_{20}$ aliphatic, cycloaliphatic or aromatic moiety, and any and all combinations thereof, with the most preferred being the $NH_4^+$-salt of pentachlorothiophenol.

Additional peptizers include aromatic or conjugated peptizers comprising one or more heteroatoms, such as nitrogen, oxygen and/or sulfur. More typically, such peptizers are heteroaryl or heterocyclic compounds having at least one heteroatom, and potentially plural heteroatoms, where the plural heteroatoms may be the same or different. Such peptizers include peptizers such as an indole peptizer, a quinoline peptizer, an isoquinoline peptizer, a pyridine peptizer, purine peptizer, a pyrimidine peptizer, a diazine peptizer, a pyrazine peptizer, a triazine peptizer, a carbazole peptizer, or combinations of such peptizers. Suitable peptizers also may include one or more additional functional groups, such as halogens, particularly chlorine; a sulfur-containing moiety exemplified by thiols, where the functional group is sulfhydryl (—SH), thioethers, where the functional group is —SR, disulfides, ($R_1S$—$SR_2$), etc.; and combinations of functional groups. Such peptizers are more fully disclosed in copending U.S. Application No. 60/752,475 filed on Dec. 20, 2005 in the name of Hyun Kim et al., the entire contents of which are herein incorporated by reference.

The core compositions can also comprise one or more accelerators of one or more classes. Accelerators are added to an unsaturated polymer to increase the vulcanization rate and/or decrease the vulcanization temperature. Accelerators can be of any class known for rubber processing including mercapto-, sulfenamide-, thiuram, dithiocarbamate, dithiocarbamyl-sulfenamide, xanthate, guanidine, amine, thiourea, and dithiophosphate accelerators. Specific commercial accelerators include 2-mercaptobenzothiazole and its metal or non-metal salts, such as Vulkacit Mercapto C, Mercapto MGC, Mercapto ZM-5, and ZM marketed by Bayer AG of Leverkusen, Germany, Nocceler M, Nocceler MZ, and Nocceler M-60 marketed by Ouchisinko Chemical Industrial Company, Ltd. of Tokyo, Japan, and MBT and ZMBT marketed by Akrochem Corporation of Akron, Ohio. A more complete list of commercially available accelerators is given in *The Vanderbilt Rubber Handbook:* 13$^{th}$ Edition (1990, R.T. Vanderbilt Co.), pp. 296-330, in *Encyclopedia of Polymer Science and Technology*, Vol. 12 (1970, John Wiley & Sons), pp. 258-259, and in *Rubber Technology Handbook* (1980, Hanser/Gardner Publications), pp. 234-236. Preferred accelerators include 2-mercaptobenzothiazole (MBT) and its salts.

The polymeric compositions used to prepare the golf balls of the present invention also can incorporate one or more fillers. The appropriate amounts of filler required will vary depending on the application but typically can be readily determined without undue experimentation. The filler preferably may be selected from the group consisting of precipitated hydrated silica, limestone, clay, talc, asbestos, barytes, glass fibers, aramid fibers, mica, calcium metasilicate, barium sulfate, zinc sulfide, lithopone, silicates, silicon carbide, diatomaceous earth, carbonates such as calcium or magnesium or barium carbonate, sulfates such as calcium or magnesium or barium sulfate, metals, including tungsten, steel, copper, cobalt or iron, metal alloys, tungsten carbide, metal oxides, metal stearates, and other particulate carbonaceous materials, and any and all combinations thereof. Preferred examples of fillers include metal oxides, such as zinc oxide and magnesium oxide. In another preferred embodiment the filler may comprise a continuous or non-continuous fiber. In another preferred embodiment the filler comprises one or more so called nanofillers, as described in U.S. Pat. No. 6,794,447 and copending U.S. patent application Ser. No. 10/670,090 filed on Sep. 24, 2003 and copending U.S. patent application Ser. No. 10/926,509 filed on Aug. 25, 2004, the entire contents of each of which are incorporated herein by reference. Examples of commercial nanofillers are various Cloisite grades including 10A, 15A, 20A, 25A, 30B, and NA+ of Southern Clay Products (Gonzales, Tex.) and the Nanomer grades including 1.24TL and C.30EVA of Nanocor, Inc. (Arlington Heights, Ill.).

Another particularly well-suited additive for use in the compositions of the present invention includes compounds having the general formula:

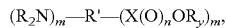

where R is hydrogen, or a $C_1$-$C_{20}$ aliphatic, cycloaliphatic or aromatic systems; R' is a bridging group comprising one or more $C_1$-$C_{20}$ straight chain or branched aliphatic or alicyclic groups, or substituted straight chain or branched aliphatic or alicyclic groups, or aromatic group, or an oligomer of up to 12 repeating units including, but not limited to, polypeptides derived from an amino acid sequence of up to 12 amino acids; and X is C or S or P with the proviso that when X=C, n=1 and y=1 and when X=S, n=2 and y=1, and when X=P, n=2 and y=2. Also, m=1-3. These materials are more fully described in copending U.S. patent application Ser. No. 11/182,170, filed on Jul. 14, 2005, the entire contents of which are incorporated herein by reference. Most preferably the material is selected from the group consisting of 4,4'-methylene-bis-(cyclohexylamine)carbamate (commercially available from R.T. Vanderbilt Co., Norwalk Conn. under the tradename Diak® 4), 11-aminoundecanoic acid, 12-aminododecanoic acid, epsilon-caprolactam; omega-caprolactam, and any and all combinations thereof.

In an especially preferred embodiment a nanofiller additive component in the golf ball of the present invention is surface modified with a compatibilizing agent comprising the earlier described compounds having the general formula:

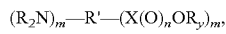

A most preferred embodiment would be a filler comprising a nanofiller clay material surface modified with an amino acid including 12-aminododecanoic acid. Such fillers are available from Nanonocor Co. under the tradename Nanomer 1.24TL.

Various compositions used as a component of the golf balls of the present invention may also comprise a monomeric amide modifier or modifiers, such as a monomeric aliphatic and/or aromatic amide polymer modifier or modifiers as described in copending U.S. patent application Ser. No. 11/592,109 By Kim et al., filed on Nov. 1, 2006, the entire contents of which are incorporated herein by reference.

Golf balls within the scope of the present invention also can include, in suitable amounts, one or more additional ingredients generally employed in golf ball compositions. Agents provided to achieve specific functions, such as additives and stabilizers, can be present. Exemplary suitable ingredients include colorants, antioxidants, colorants, dispersants, mold releasing agents, processing aids, fillers, and any and all combinations thereof. Although not required, UV stabilizers, or photo stabilizers such as substituted hydroxyphenyl benzotriazoles may be utilized in the present invention to enhance the UV stability of the final compositions. An example of a commercially available UV stabilizer is the stabilizer sold by Ciba Geigy Corporation under the tradename TINUVIN. If desired, the various polymer compositions used to prepare the golf balls of the present invention can additionally contain other conventional additives such as plasticizers, pigments, antioxidants, U.V. absorbers, optical brighteners, or any other additives generally employed in plastics formulation or the preparation of golf balls.

The various core components may also be combined to form a golf ball by a compression molding process, which is also well known to one of ordinary skill in the art. Although the curing time depends on the various materials selected, those of ordinary skill in the art will be readily able to adjust the curing time upward or downward based on the particular materials used and the discussion herein.

The various intermediate layer and/or cover formulations may be produced using a twin-screw extruder or can be blended manually or mechanically prior to the addition to the injection molder feed hopper. Finished golf balls may be prepared by initially positioning the solid preformed core in an injection-molding cavity followed by uniform injection of the intermediate and/or cover layer composition sequentially over the core. The cover formulations can be injection molded around the cores to produce golf balls of the required diameter.

Alternatively, the cover layers may also be formed around the core by first forming half shells by injection molding followed by compression molding the half shells about the core to form the final ball.

Covers may also be formed around the cores using compression molding. Cover materials for compression molding may also be extruded or blended resins or castable resins.

VI. Golf Ball Properties

FIG. 1 illustrates a two-piece golf ball 10 comprising a solid center or core 12, and an outer cover layer 14. Golf balls also typically include plural dimples 16 formed in the outer cover and arranged in various desired patterns.

Figure 2:
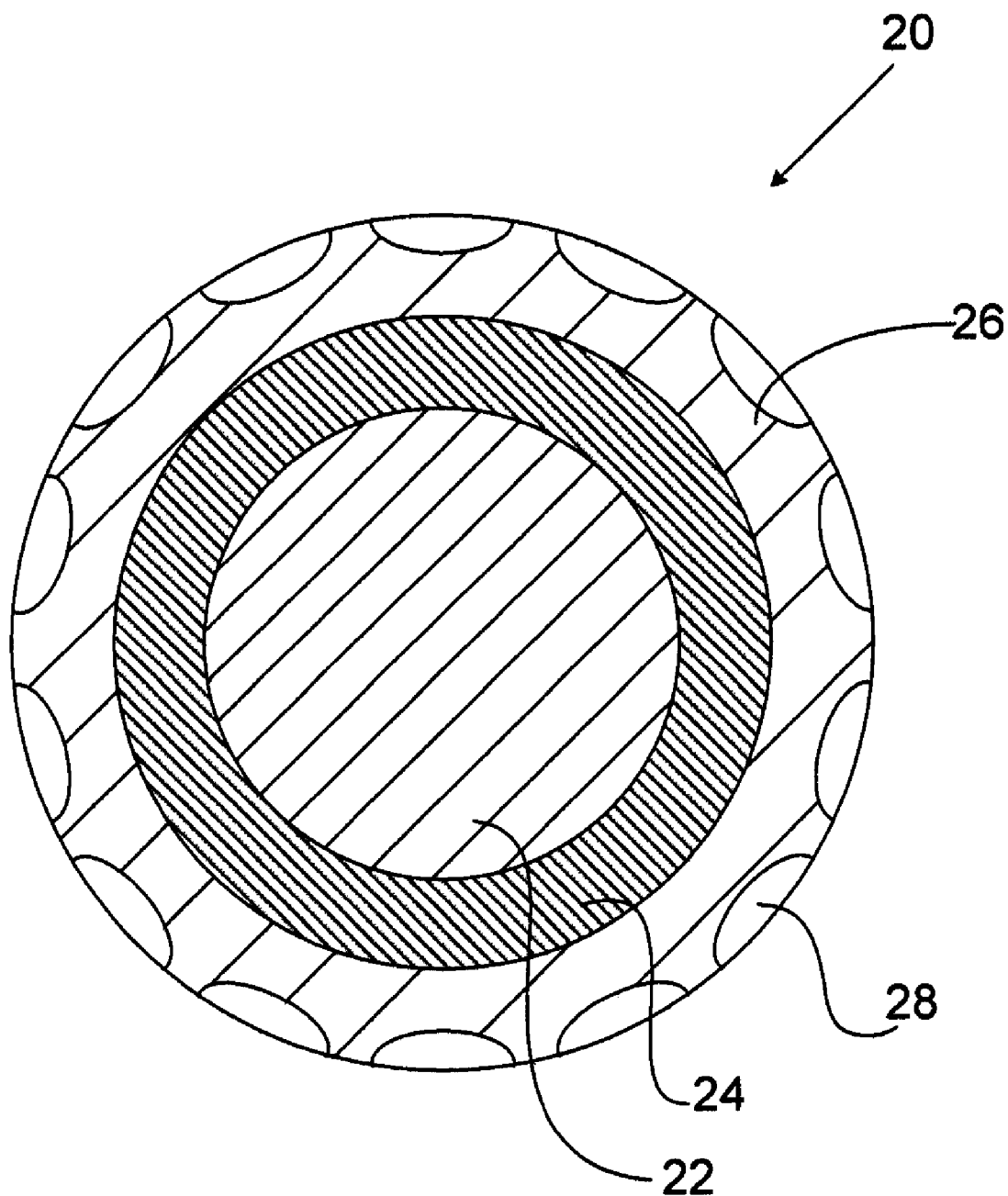
FIG. 2 is a schematic cross section of a three-piece golf ball.

FIG. 2 illustrates a 3-piece golf ball 20 comprising a core 22, an intermediate layer 24 and an outer cover layer 26. Golf ball 20 also typically includes plural dimples 28 formed in the outer cover layer 26 and arranged in various desired patterns.

Figure 3:
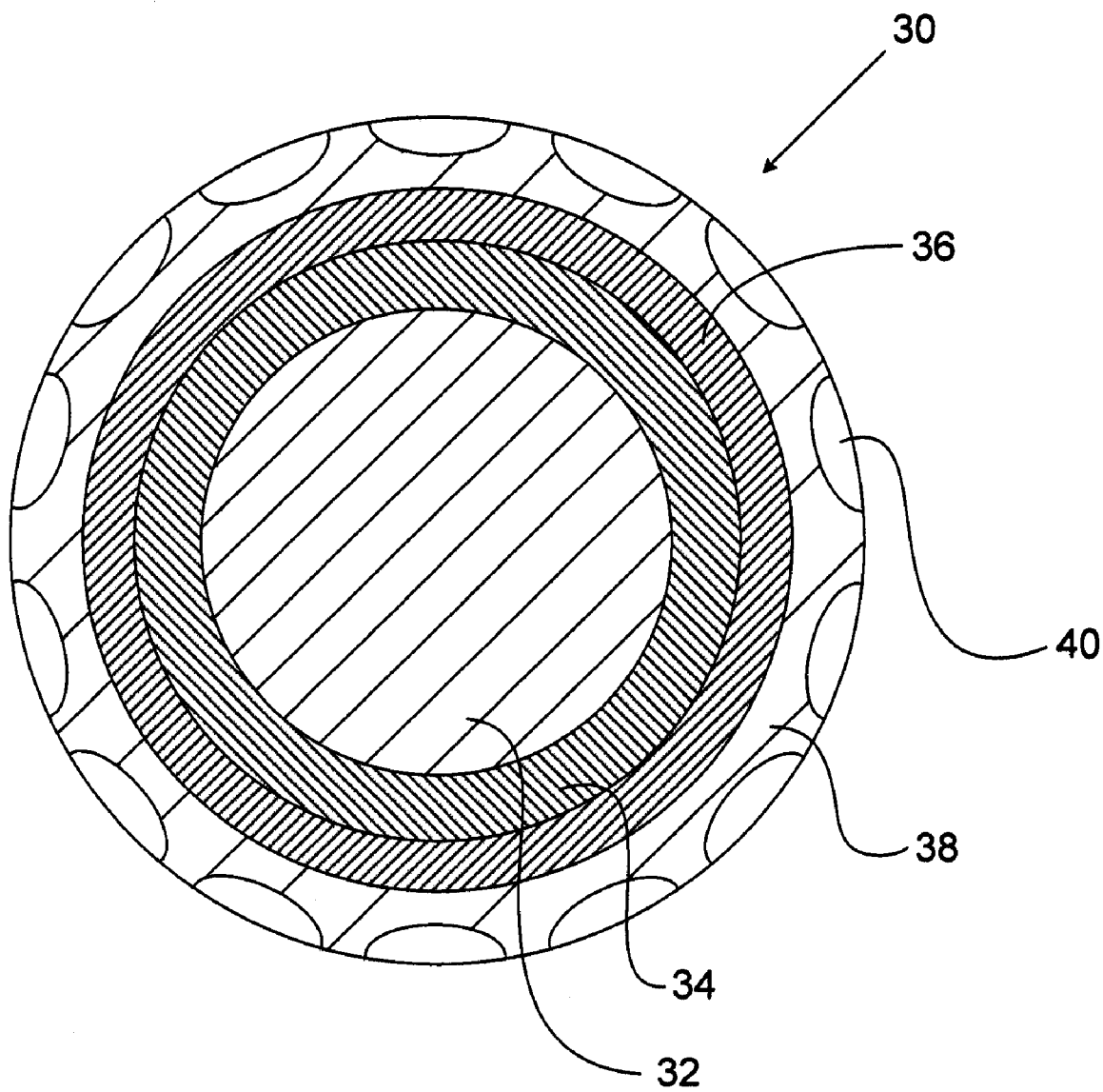
FIG. 3 is a schematic cross section of a four-piece golf ball.

FIG. 3 illustrates a 4-piece golf ball 30 comprising a core 32, an inner intermediate layer 34, an outer intermediate layer 36 and an outer cover layer 38. Golf ball 30 also typically includes plural dimples 40 formed in the outer cover layer 38 and arranged in various desired patterns.

Figure 4:
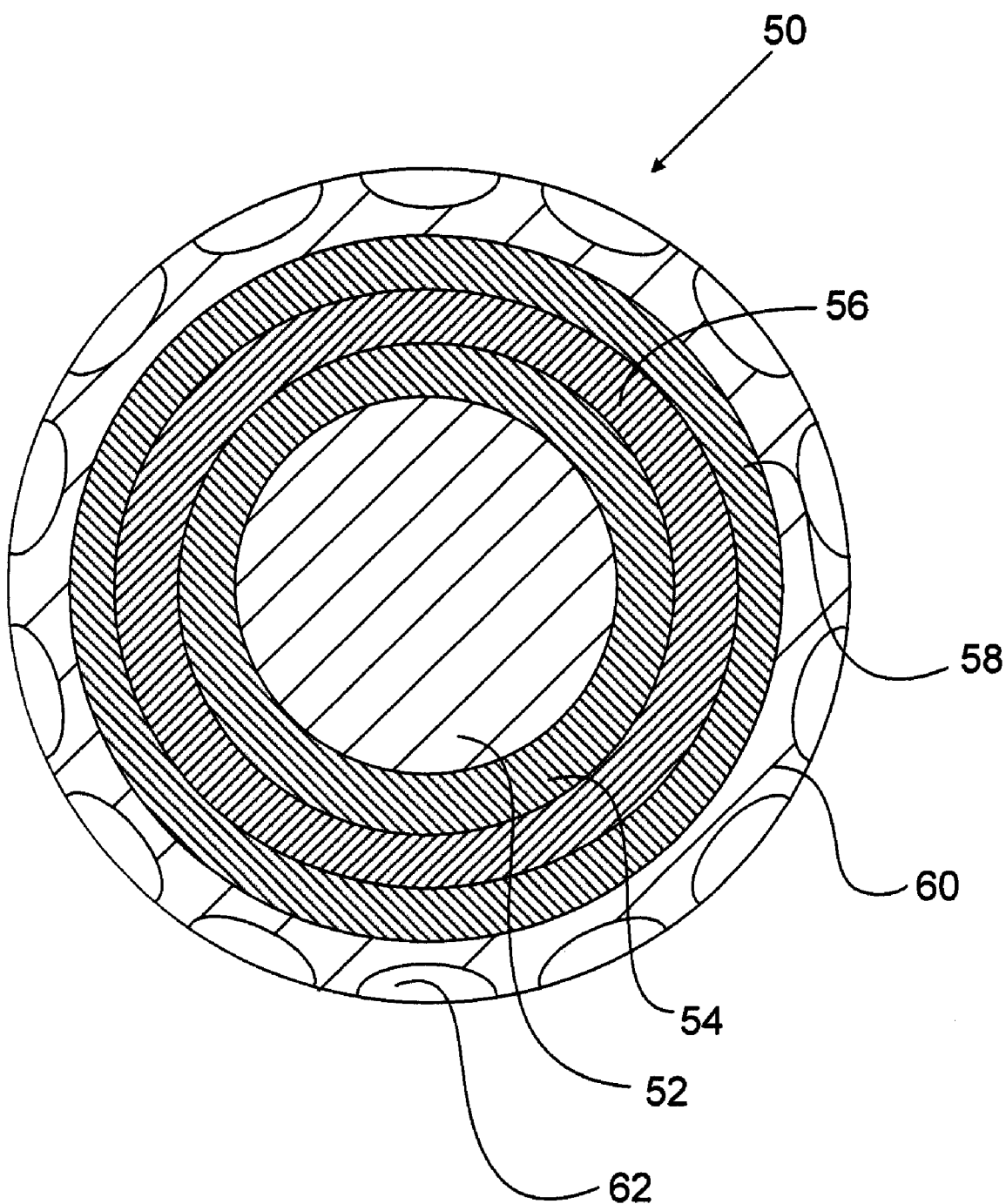
FIG. 4 is a schematic cross section of a five-piece golf ball.

FIG. 4 illustrates a 5-piece golf ball 50 comprising a core 52, a first inner intermediate layer 54, a second inner intermediate layer 56, a third inner intermediate layer 58, and an outer cover layer 60. Golf ball 50 also typically includes plural dimples 62 formed in the outer cover layer 60 and arranged in various desired patterns.

FIGS. 1-4 illustrate two- to five-piece golf ball constructions. However, a person of ordinary skill in the art will appreciate that golf balls of the present invention may comprise any number of layers, including from 0 to at least 5 intermediate layer(s), but preferably from 0 to 3 intermediate layer(s), more preferably from 1 to 3 intermediate layer(s), and most preferably 1 to 2 intermediate layer(s).

The present invention can be used to form golf balls of any desired size. "The Rules of Golf" by the USGA dictate that the size of a competition golf ball must be at least 1.680 inches in diameter; however, golf balls of any size can be used for leisure golf play. The preferred diameter of the golf balls is from about 1.670 inches to about 1.800 inches. Oversize golf balls with diameters above about 1.760 inches to as big as 2.75 inches also are within the scope of the invention.

In one embodiment of the present invention, two-piece balls are disclosed comprising a core, and a cover comprising the isocyanate-modified compositions of the present invention.

The core of the two-piece golf balls of the present invention has a diameter of from about 0.5 to about 1.62, preferably from about 0.7 to about 1.60, more preferably from about 1 to about 1.58 inches.

The core of the two-piece golf balls of the present invention has a PGA compression of from about 10 to about 100, preferably from about 35 to about 90, more preferably from about 40 to about 80.

The cover of the two piece golf balls of the present invention has a thickness of from about 0.01 to about 0.20, preferably from about 0.02 to about 0.15 inch, more preferably from about 0.03 to about 0.10 and most preferably from about 0.03 to about 0.07 inches.

In addition, the cover of the two piece golf balls of the present invention has a hardness of from about 25 to about 80, more preferably from about 30 to about 70, even more preferably from about 40 to about 60 Shore D.

Two piece golf ball of the present invention have a PGA ball compression greater than about 30, preferably greater than 40, more preferably greater than about 50, most preferably greater than about 60.

The core of the three piece golf balls of the present invention has a diameter of from about 0.5 to about 1.62, preferably from about 0.7 to about 1.60, more preferably from about 1 to about 1.58 inches.

The core of the three piece golf balls of the present invention has a PGA compression of from about 10 to about 100, preferably from about 35 to about 90, more preferably from about 40 to about 80.

The cover of the three piece golf balls of the present invention has a thickness of from about 0.01 to about 0.20 inch, preferably from about 0.02 to about 0.15 inch, more preferably from about 0.03 to about 0.10 inch and most preferably from about 0.03 to about 0.07 inches.

The cover of the three piece golf balls of the present invention also has a hardness of from about 25 to about 80, more preferably from about 30 to about 70, even more preferably from about 40 to about 60 Shore D.

Three piece golf balls of the present invention have a PGA ball compression greater than about 30, preferably greater than 40, more preferably greater than about 50, most preferably greater than about 60.

The core of the golf balls of the present invention having two or more intermediate layers has a diameter of from about 0.5 to about 1.62, preferably from about 0.7 to about 1.60, more preferably from about 1 to about 1.58, yet more preferably from about 1.20 to about 1.54, and most preferably from about 1.40 to about 1.50 in.

The core the golf balls of the present invention having two or more intermediate layers has a PGA compression of from about 10 to about 100, preferably from about 35 to about 90, more preferably from about 40 to about 80.

The core the golf balls of the present invention having two or more intermediate layers may also comprise a center and one or more core layers disposed around the center. These core layers may be made from the same rubber as used in the center portion, or may be a different elastomer. The various core layers (including the center) may each exhibit a different hardness. The difference between the center hardness and that of the next adjacent layer, as well as the difference in hardness between the various core layers is greater than 2, preferably greater than 5, most preferably greater than 10 units of Shore D.

In one preferred embodiment, the hardness of the center and each sequential layer increases progressively outwards from the center to outer core layer.

In another preferred embodiment, the hardness of the center and each sequential layer decreases progressively inwards from the outer core layer to the center.

The intermediate layers of the golf balls of the present invention having two or more intermediate layers have a thickness of about 0.01 to about 0.50, preferably from about 0.02 to about 0.30 or more preferably from about 0.03 to about 0.20 or most preferably from about 0.03 to about 0.10 in.

The intermediate layers of the golf balls of the present invention having two or more intermediate layers also have a hardness greater than about 25, preferably greater than about 30, more preferably greater than about 40, and most preferably greater than about 50, Shore D units as measured on the ball.

The intermediate layers of the golf balls of the present invention having two or more intermediate layers also have a flexural modulus from about 5 to about 500, preferably from about 15 to about 400, more preferably from about 20 to about 300, still more preferably from about 25 to about 200, and most preferably from about 30 to about 150 kpsi.

The cover layer of the golf balls of the present invention having two or more intermediate layers has a thickness of about 0.01 to about 0.10, preferably from about 0.02 to about 0.08, more preferably from about 0.03 to about 0.06 in.

The cover layer of the golf balls of the present invention having two or more intermediate layers also has a hardness from about 40 to about 70, preferably from about 45 to about 70 or about 50 to about 70, more preferably from about 47 to about 68 or about 45 to about 70, and most preferably from about 50 to about 65 Shore D as measured on the ball.

The COR of the two, three- or multi-piece golf balls of the present invention is greater than about 0.760, preferably greater than about 0.780, more preferably greater than 0.790, most preferably greater than 0.795, and especially greater than 0.800 at 125 ft/sec inbound velocity.

The COR of the two, three- or multi-piece golf balls of the present invention is also greater than about 0.760, preferably greater than about 0.780, more preferably greater than 0.790, most preferably greater than 0.795, and especially greater than 0.800 at 143 ft/sec inbound velocity.

EXAMPLES

The following examples are provided to illustrate certain features of a working embodiment of the present invention. The scope of the invention is not limited to the particular features exemplified by these examples.

A. Materials

EVAL H171 is a vinyl alcohol polymer (EVOH) having a 38 mol % of ethylene content with 9.3 melt index at 190° C. and is available from Kuraray Company of Kurashiki, Japan EVAL C109 is a vinyl alcohol polymer (EVOH) having a 35 mol % of ethylene content with 1.7 melt index at 190° C. and is available from Kuraray Company of Kurashiki, Japan HG252 is the hydrogenated product of a block polymer of styrene and butadiene and having a hydroxyl group at the terminal block copolymer. An example of this polymer is sold under the trade name SEPTON HG-252 by Kuraray Company of Kurashiki, Japan.

NW5 is a caprolactam-blocked cycloaliphatic isocyanate based on IPDI and available from Bayer MaterialScience.

MDA is 4,4'-methylene dianiline available from Fluka or Aceto Corporation

CAYTUR 31 is a delayed action diamine curative primarily for use with urethane prepolymers based on TDI, or MDI. It consists of a complex of methylene dianiline (MDA) and sodium chloride dispersed in dioctyl phthalate.

NUCREL 960 is a copolymer of ethylene and methacrylic acid, made with nominally 15 wt % methacrylic acid E.I. DuPont de Nemours & Co.

SURLYN® 9150 is an ionomer and commercially available from E.I. DuPont de Nemours & Co.

SURLYN® 8150 is an ionomer and commercially available from E.I. DuPont de Nemours & Co.

HPF 1000 is a combined material of acid copolymer and/or partially neutralized ionomer, organic acids and/or metal salts, and neutralizing agents and commercially available from E.I. DuPont de Nemours & Co.

LOTRYL 37 EH 550 is a random copolymer of ethylene and 2-ethylhexyl acrylate, prepared by the high pressure polymerization process and is commercially available from Arkema.

B. Test Methods

Tensile strength (psi) was measured by Universal Material Testing machines from Instron Corp.

Tensile Elongation (%) was measured by Universal Material Testing machines from Instron Corp.

Flex modulus (kpsi) was measured by Universal Material Testing machines from Instron Corp.

Material Hardness (Shore D) was measured by Shore instruments from Instron Corp.

On the ball hardness (Shore D) was measured by Shore instruments from Instron Corp.

Compression (PGA) was measured by Automated Design Corporation.

The over shear cut test was done with ADC machine having steel-arm with a pitching wedge face having a 45 degree loft-type striking plate. (Arm speed: 110 fps) and the results classified using the following shear cut index 1: No damage on the ball
2: The golf ball surface has very slightly cut or not noticeable damage.
3: The golf ball surface has a cut but minor damage
4: The golf ball surface is clearly cut and becomes fluffy.
5: The golf ball surface is considerably damaged and noticeably becomes fluffy.

Example 1

1) A polymer blend HG252 and EVAL H171 was prepared by extrusion compounding the two polymers in a weight ratio of 65/35 respectively in order to produce the desired final hardness of the final composition. In order to maintain shore D 45-55 of the blend, a blend ratio of 65/35 was used. The extrusion temperature was from 150 to 180° C.
2) A master batch of 50 pph of NW5 blocked isocyanate and 50 pph of Nucrel 960 was also prepared by extrusion compounding at a temperature of 100-120° C.
3) The polymer blend from step 1 was dry blended with the master batch from step 2 at selected relative amounts, and the resulting mixture was injection molded at 250° C. to form a plaque having the composition and properties summarized in Table 1:

TABLE 1

| Example No. | Comp Ex 1 | Ex 1A | Ex 1B | Ex 1C | Ex 1D | Ex 1E |
|---|---|---|---|---|---|---|
| HG252/EVAL H171 (wt ratio) | 65/35 | 65/35 | 65/35 | 65/35 | 65/35 | 65/35 |
| Master batch (pph) | 0 | 2 | 6 | 10 | 14 | 18 |
| NW5, (pph) | 0 | 1 | 3 | 5 | 7 | 9 |
| Tensile strength (psi) | 2541 | 1892 | 2575 | 2764 | 2911 | 3088 |
| Tensile Elongation (%) | 324 | 421 | 450 | 380 | 334 | 289 |
| Flex modulus (kpsi) | 91.9 | 41.6 | 19.5 | 16.5 | 16.2 | 17.1 |
| Hardness (Shore D) | 43.1 | 41.9 | 39.6 | 42.7 | 43.7 | 45.0 |

These data demonstrate that the Shore D hardness is preserved, while tensile strength increases as the blocked isocyanate content increases. Tensile elongation is also increased to an optimum level while flex modulus decreases with blocked isocyanate content.

Example 2

1) A golf ball core was prepared by compression molding at 170° C. for 7 minutes at 3,000 psi, a rubber formulation based on polybutadiene to which was added 18 pph ZnO, 25 pph zinc diacrylate, and 1.7 pph Varox 231XL, to produce a core having a PGA compression of 60 and a diameter of 1.48 inches.
2) Around this core was then injection molded an intermediate layer made from HPF 1000 to form a golf ball core/intermediate layer precursor having a diameter of 1.58 inches.
3) A polymer blend comprising HG252 and EVAL H171 was prepared by extrusion compounding the two polymers in a weight ratio of 65/35 respectively.
4) A master batch of 50 pph of NW5 blocked isocyanate and 50 pph of Nucrel 960 was also prepared by extrusion compounding at a temperature of 100-120° C.
5) The polymer blend from step 1 was dry blended with the master batch from step 2 at selected relative amounts.
6) The compositions from step 5 were then formed into a golf ball cover by injection molding at 250° C., around a golf ball precursor from steps 1 and 2.
7) The resulting compositions and golf ball properties are summarized in Table 2.

TABLE 2

| Composition | Ex 2 | Comp Ex 2A | Comp Ex 2A | Comp Ex 2A |
|---|---|---|---|---|
| HG252/EVAL H171 | 65/35 | 65/35 | N/A | N/A |
| Master batch (pph) | 6 | 0 | | |
| NW5, (pph) | 3 | 0 | | |
| Golf Ball | | | Maxfli Rev EXT | Taylor Made TP Red |
| Ball PGA Compression | 84 | 85 | 85 | 92 |
| Cover Hardness (Shore D) | 44.0 | 45.8 | 65 | 60 |
| Shear Cut* | 2.70 | 4.35 | 3.33 | 1.75 |

These data demonstrate that the cover shear cut resistance improved by 1.65 index units by the addition of 3 pph of the blocked isocyanate after injection molding. In addition, the shear cut resistance of Comp Ex 2A showed a poor shear-cut resistance compared to two commercially available balls, the Maxfli® Revolution Ext Distance ball which has 65 Dionomer cover and the TaylorMade® TP Red ball having a soft thermoset urethane cover. In general, shear-cut resistance gets better when the cover hardness is increased. However, group B with additional 3 pph of blocked isocyanate showed much improved shear-cut resistance, even better than 65 Dionomer covered ball.

Example 3

1) A golf ball core was prepared by compression molding at 170° C. for minutes at 3,000 psi, a rubber formulation based on polybutadiene to which was added 18 pph ZnO, 25 pph zinc diacrylate, and 1.7 pph Varox 231XL, to result in a core having a PGA compression of 60 and a diameter of 1.48 inches.
2) Around this core was then injection molded an intermediate layer made from a blend of 50/50 Surlyn® 9150/8150 to form a golf ball core/intermediate layer precursor having a diameter of 1.58 inches.
3) A polymer blend comprising HG252 and EVAL C109 and selected amounts of Caytur 31 diamine as shown in Table 3 was prepared by extrusion compounding. The extrusion temperature was from 150 to 180° C.
4) A master batch of 50 pph of NW5 blocked isocyanate and 50 pph of Lotryl 37EH550 was also prepared by extrusion compounding at a temperature of 100° C.
5) The polymer blend from step 1 was dry blended with the master batch from step 2 at selected relative amounts.
6) The compositions from step 5 were then formed into a golf ball cover having size of 1.690 inches diameter without dimple by injection molding at 250-260° C. around a golf ball precursor from step 2.
7) In order to put the dimple and squeeze down to 1.680 inches ball diameter the compression molding was carried out for 2.5 minutes at 160° C.
8) The resulting compositions and golf ball properties are summarized in Table 3.

TABLE 3

| Composition | A | B | C |
|---|---|---|---|
| HG252/EVAL C109 | 65/35 | 65/35 | |
| Caytur 31 (pph) | | 2 | |
| MFI at 230° C. | 21.9 | 28.6 | |
| NW5 Master batch* | | 14 pph | 18 pph |
| 1.48" Core CC | 60 | | |
| 1.58" Mantle | | | |
| Ionomer blend, 68 Shore D | | 100 | |
| Ball Cover Hardness | 46.2 | 46.0 | 46.2 |
| Shear Cut** | 4.02 | 2.42 | 1.98 |

*Net amount of NW5
**In comparison the TaylorMade TP Red had a Shear Cut Index of 1.32, and the Maxfli Revolution Ext Distance had a Shear Cut Index of 2.85

These data demonstrate that the addition of 2 pph of Caytur 31 increased MFI of the blend from 21.9 to 28.6 (A vs. B & C). Also, Group A without NW5 in the cover showed much worse shear-cut resistance compared to those of the TaylorMade TP Red and the Maxfli Revolution EXT Distance balls. Group B and C showed much improved shear-cut resistance compared to that of group A. In general, for 3 piece balls having the same ball construction, shear-cut resistance gets worse when the mantle hardness is increased. The Maxfli Revolution EXT Distance ball has the same ball construction as Group A, B, and C balls, except for the mantle and cover compositions. Rev. EXT Distance has a mantle with an ionomer having 50 Shore D and cover with ionomer having 65 Shore D. From those, it is expected that Maxfli Revolution EXT Distance ball would show much better shear-cut resistance than those group of A, B, and C. However, group B and C having a harder (68D) mantle and softer cover than the Maxfli Revolution EXT Distance ball showed much better shear-cut resistance. Group C even showed a comparable shear-cut resistance to that of the TaylorMade TP Red thermoset-urethane covered ball.

Example 4

1) A golf ball core was prepared by compression molding at 170° C. for 7 minutes at 3,000 psi, a rubber formulation based on polybutadiene to which was added 18 pph ZnO, 25 pph zinc diacrylate, and 1.7 pph Varox 231XL, to result in a core having a PGA compression of 60 and a diameter of 1.48 inches.
2) Around this core was then injection molded an intermediate layer made from a blend of 50/50 of Surlyn 9150/8150 to form a golf ball core/intermediate layer precursor having a diameter of 1.58 inches.
3) A polymer blend comprising HG252 and EVAL C109 was prepared by extrusion compounding the two polymers in a weight ratio of 65/35 respectively and selected amounts of 4,4'-methylene dianiline (MDA). Extrusion temperature was from 150 to 180° C.
4) A master batch of 70 pph of NW5 blocked isocyanate and 30 pph of Lotryl 37EH550 was also prepared by extrusion compounding at a temperature of 80° C.
5) The polymer blend from step 1 was dry blended with the master batch from step 2 at selected relative amounts.
6) The compositions from step 5 were then formed into a half cups (O.D. is 1.685 and I.D. is 1.580) by injection molding at 240-250° C.
7) Golf balls were formed from the prepared half cups by compression molding at 160-180° C. for 3 minutes around a golf ball precursor from step 2.
8) The resulting compositions and golf ball properties are summarized in Table 4.

TABLE 4

| Cover Composition | A | B | C | D | E |
|---|---|---|---|---|---|
| HG252/EVAL C109 | 65/35 | | | 65/35 | |
| MDA | | | 1 | | |
| NW5 Master batch* | | 5 | 7 | 9 | 11 |
| 1.48" Core CC | | | 60 | | |
| 1.58" Mantle Ionomer blend, 68 Shore D | | | 100 | | |
| Ball Cover Hardness Shore D | 54 | 49 | 49 | 50 | 51 |
| Shear Cut Index** | 4.53 | 2.99 | 2.53 | 2.49 | 2.39 |

*Net amount of NW5.
**In comparison the TaylorMade TP Red had a Shear Cut Index of 1.23, and the Maxfli Revolution Ext Distance had a Shear Cut Index of 4.69

These data demonstrate that the addition of 5-11 pph of NW5 improved the shear-cut resistance substantially when comparing Group A vs. Group B, C, D, and E and the Maxfli Rev. EXT Distance ball.

The invention claimed is:

1. A golf ball comprising a cover layer, a core, and optionally one or more intermediate layers, and wherein the cover layer comprises an isocyanate-modified composition comprising the reaction product of:
   from about 65 to about 99 weight % (based on the total weight of the isocyanate-modified composition) of a base polymer selected from ethylene-vinyl alcohol copolymers, chitosan, or mixtures thereof; and
   from about 1 to about 35 weight % (based on the total weight of the isocyanate-modified composition) of a blocked isocyanate.

2. The golf ball according to claim 1 further comprising one or more intermediate layers comprising a composition selected from:
   A. one or more ionomers selected from unimodal ionomers, bimodal ionomers, modified unimodal ionomers, modified bimodal ionomers, and all combinations thereof;
   B. the reaction product of
      i. at least one component that is a monomer, oligomer, prepolymer, or polymer comprising at least 5% by weight of acidic functional groups;
      ii. at least one component that is a monomer, oligomer, prepolymer, or polymer comprising less by weight of acidic functional groups than the weight percentage of acidic functional groups of the at least one component I; and
      iii. at least one component that is a basic metal salt capable of neutralizing the acidic functional groups component I, and thereby forming a polymer blend composition, wherein the polymer blend composition incorporates an in-situ-formed pseudo-crosslinked network of the at least one component I in the presence of the at least one component ii;
   C. a polymer of a $C_5$-$C_{12}$ cyclic olefin, selected from polypentenamer rubber, polyheptenamer rubber, polyhexenamer rubber polyoctenamer rubber, polydecenamer rubber and polydodecenamer rubber and all combinations thereof;
   D. a blend composition comprising at least one polyalkenamer and at least one polyamide selected from polyamide elastomers, thermoplastic copolyamides and mixtures thereof; and
   E. any and all combinations of A, B, C, and D.

3. The golf ball according to claim 1 where the cover, core and/or the one or more intermediate layers further comprises a compound selected synthetic and natural rubbers, thermoset polyurethanes and thermoset polyureas, unimodal ethylene/carboxylic acid copolymers, unimodal ethylene/carboxylic acid/carboxylate terpolymers, bimodal ethylene/carboxylic acid copolymers, bimodal ethylene/carboxylic acid/carboxylate terpolymers, unimodal ionomers, bimodal ionomers, modified unimodal ionomers, modified bimodal ionomers, polyurethane ionomer, thermoplastic polyurethanes, thermoplastic polyureas, polyamides, copolyamides, polyesters, copolyesters, polycarbonates, polyolefins, halogenated polyolefins, halogenated polyethylenes, polyphenylene oxide, polyphenylene sulfide, diallyl phthalate polymer, polyimides, polyvinyl chloride, polyamide-ionomer, polyvinyl alcohol, polyarylate, polyacrylate, polyphenylene ether, impact-modified polyphenylene ether, polystyrene, high impact polystyrene, acrylonitrile-butadiene-styrene copolymer styrene-acrylonitrile (SAN), acrylonitrile-styrene-acrylonitrile, styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, polysiloxane and any and all combinations of such materials.

4. The golf ball according to claim 1 wherein the cover layer has a flexural modulus of from about 0.1 to about 300 kpsi.

5. The golf ball according to claim 1 wherein the ethylene-vinyl alcohol copolymer has an ethylene content of from 10 to 90 mole percent.

6. The golf ball according to claim 1 wherein the ethylene-vinyl alcohol copolymer has an ethylene content of from 25 to 75 mole percent.

7. The golf ball according to claim 1 wherein the ethylene-vinyl alcohol copolymer has a degree of hydrolysis of at least 96%.

8. The golf ball according to claim 1 wherein the ethylene-vinyl alcohol copolymer has a degree of hydrolysis of at least 99%.

9. The golf ball according to claim 1 wherein the ethylene-vinyl alcohol copolymer has a polymer backbone, and wherein the backbone has pendent carboxyl (—COOH) groups grafted thereto.

10. The golf ball according to claim 9 wherein the pendent carboxyl groups are partially neutralized.

11. The golf ball according to claim 9 wherein the pendent carboxyl groups are fully neutralized.

12. The golf ball according to claim 1 wherein the chitosan has a degree of deacetylation of from about 60% to 100%.

13. The golf ball according to claim 1 wherein the chitosan has a degree of deacetylation of greater than 70%.

14. A golf ball comprising a cover layer, a core, and optionally one or more intermediate layers, and wherein the cover layer comprises an isocyanate-modified composition comprising the reaction product of:
   from about 65 to about 99 weight % (based on the total weight of the isocyanate-modified composition) of a base polymer selected from ethylene-vinyl alcohol copolymers having an ethylene content of from about 10 to about 90 mole percent and degree of hydrolysis of at least 96%, chitosan having a degree of deacetylation of from about 60% to 100%, or mixtures thereof; and
   from about 1 to about 35 weight % (based on the total weight of the isocyanate-modified composition) of a blocked isocyanate.

* * * * *